US012573845B2

(12) United States Patent
Vander Schueren et al.

(10) Patent No.: US 12,573,845 B2
(45) Date of Patent: Mar. 10, 2026

(54) POWER MANAGEMENT WITH AN ENERGY STORAGE SYSTEM

(71) Applicant: Nabors Drilling Technologies USA, Inc., Houston, TX (US)

(72) Inventors: Michael Vander Schueren, Calgary (CA); Jose Abelardo Sanchez, Richmond, TX (US); Vasil Gleba, Calgary (CA); John Patterson, Cypress, TX (US)

(73) Assignee: Nabors Drilling Technologies USA, Inc., Houston, TX (US)

( * ) Notice: Subject to any disclaimer, the term of this patent is extended or adjusted under 35 U.S.C. 154(b) by 110 days.

(21) Appl. No.: 18/450,916

(22) Filed: Aug. 16, 2023

(65) Prior Publication Data

US 2024/0063636 A1 Feb. 22, 2024

Related U.S. Application Data

(60) Provisional application No. 63/371,663, filed on Aug. 17, 2022.

(51) Int. Cl.
*E21B 19/00* (2006.01)
*H02J 1/002* (2026.01)
(Continued)

(52) U.S. Cl.
CPC ............... *H02J 1/14* (2013.01); *H02J 1/002* (2020.01); *H02M 1/0009* (2021.05);
(Continued)

(58) Field of Classification Search
CPC ...... H02J 1/14; H02J 1/002; H02J 3/32; H02J 7/00; H02J 7/14; H02M 1/0009;
(Continued)

(56) References Cited

U.S. PATENT DOCUMENTS

| | | | |
|---|---|---|---|
| 4,309,734 A | 1/1982 | Warren | |
| 7,615,893 B2 | 11/2009 | Biester et al. | |

(Continued)

FOREIGN PATENT DOCUMENTS

| | | |
|---|---|---|
| CN | 105350926 A | 2/2016 |
| CN | 105480884 A | 4/2016 |

(Continued)

OTHER PUBLICATIONS

International Search Report and Written Opinion for PCT/US2022/080971, mailed Apr. 24, 2023, 10 pages.
(Continued)

*Primary Examiner* — Rexford N Barnie
*Assistant Examiner* — Xuan Ly
(74) *Attorney, Agent, or Firm* — Alston & Bird LLP

(57) ABSTRACT

A method that can include coupling one or more loads of the system to a common direct current (DC) bus, measuring a voltage of the common DC bus, estimating a nominal voltage (Vnom) for the common DC bus, and determining a set point (DCSP) for each inverter based on the Vnom, where the inverters control a flow of DC current through the inverters based on the DCSP. A method that can include coupling one or more loads of the system to a common DC bus, measuring a voltage of the common DC bus, detecting a change in the voltage, managing a DCSP for each of inverters, where the inverters are configured to control the DC current flowing through the one or more inverters based on the DCSP, and managing DC current flowing through the inverters coupled between the ESS and the common DC bus.

19 Claims, 10 Drawing Sheets

(51) Int. Cl.

| | |
|---|---|
| *H02J 1/14* | (2006.01) |
| *H02J 7/00* | (2006.01) |
| *H02J 7/14* | (2006.01) |
| *H02M 1/00* | (2006.01) |
| *H02M 7/797* | (2006.01) |
| *H02P 5/74* | (2006.01) |
| *E02F 9/20* | (2006.01) |
| *E21B 41/00* | (2006.01) |

(52) U.S. Cl.
CPC ......... *H02M 1/0067* (2021.05); *H02M 7/797* (2013.01); *E02F 9/2058* (2013.01); *E21B 41/00* (2013.01)

(58) Field of Classification Search
CPC ... H02M 1/0067; H02M 7/797; E02F 9/2058; E21B 41/00; E21B 19/00; H02P 5/74
USPC .......................................................... 307/35
See application file for complete search history.

(56) References Cited

U.S. PATENT DOCUMENTS

| | | | |
|---|---|---|---|
| 8,184,460 | B2 | 5/2012 | O'Brien et al. |
| 8,295,950 | B1 | 10/2012 | Wordsworth et al. |
| 8,446,037 | B2 | 5/2013 | Williams |
| 9,394,770 | B2 | 7/2016 | Boot et al. |
| 9,450,433 | B2 | 9/2016 | Di Cristofaro |
| 9,496,702 | B2 | 11/2016 | Dong et al. |
| 9,535,410 | B2 | 1/2017 | Di Cristofaro |
| 9,628,016 | B2 | 4/2017 | Lamascus et al. |
| 9,803,461 | B2 | 10/2017 | Boone |
| 10,100,835 | B2 | 10/2018 | Torrey et al. |
| 10,283,966 | B2 | 5/2019 | Macdonald |
| 10,337,424 | B2 | 7/2019 | Janik |
| 10,389,113 | B2 | 8/2019 | Bourgeau |
| 10,483,765 | B2 | 11/2019 | Pedersen |
| 10,797,510 | B2 | 10/2020 | Foo et al. |
| 11,196,278 | B2 | 12/2021 | Agamy et al. |
| 2009/0195074 | A1 | 8/2009 | Buiel |
| 2009/0312885 | A1 | 12/2009 | Buiel |
| 2011/0074165 | A1 | 3/2011 | Grimes et al. |
| 2014/0077600 | A1 | 3/2014 | Cryer et al. |
| 2017/0373498 | A1 | 12/2017 | Haugan et al. |
| 2019/0115758 | A1 | 4/2019 | Orban et al. |
| 2019/0199122 | A1 | 6/2019 | Petit |
| 2019/0226296 | A1 | 7/2019 | Rakhunde et al. |
| 2019/0267805 | A1 | 8/2019 | Kothuru et al. |
| 2020/0144853 | A1 | 5/2020 | Andersen et al. |
| 2020/0169088 | A1* | 5/2020 | Myers ...................... H02J 7/34 |
| 2020/0220135 | A1 | 7/2020 | Pedersen |
| 2020/0270948 | A1 | 8/2020 | Kothuru et al. |
| 2021/0107616 | A1 | 4/2021 | Pedersen |
| 2022/0145730 | A1 | 5/2022 | Benson et al. |
| 2022/0162933 | A1 | 5/2022 | El Tawy et al. |
| 2022/0234408 | A1* | 7/2022 | Jonson ................ B60G 17/016 |
| 2023/0205146 | A1 | 6/2023 | Williams |

FOREIGN PATENT DOCUMENTS

| | | |
|---|---|---|
| CN | 209170031 U | 7/2019 |
| CN | 213235031 U | 5/2021 |
| EP | 2583368 B1 | 6/2019 |
| WO | 2019084530 A1 | 5/2019 |
| WO | 2019088899 A1 | 5/2019 |
| WO | 2020070201 A1 | 4/2020 |
| WO | 2020219091 A1 | 10/2020 |
| WO | 2021113953 A1 | 6/2021 |
| WO | 2023129794 A1 | 7/2023 |

OTHER PUBLICATIONS

CleanDesign Power Systems Inc., "Fuel & Emissions Calculation Overview", first published Sep. 1, 2019, www.cleandesignic.com, 10 pages.

\* cited by examiner

640

642
Use Default
LL and HL 644
10 < SOC < 90?

YES

NO

646
SOC < 10?

YES

648
Set LL to Zero

NO

650
SOC > 90?

YES

652
Set HL to Zero

NO

POWER MANAGEMENT WITH AN ENERGY STORAGE SYSTEM

CROSS-REFERENCE TO RELATED APPLICATION(S)

This application claims priority under 35 U.S.C. § 119(e) to U.S. Provisional Application No. 63/371,663, entitled "POWER MANAGEMENT WITH AN ENERGY STORAGE SYSTEM," by Michael VANDERSCHUEREN et al., filed Aug. 17, 2022, which is assigned to the current assignee hereof and incorporated herein by reference in its entirety.

FIELD OF THE DISCLOSURE

The present invention relates, in general, to the field of drilling and processing of wells. More particularly, present embodiments relate to a system or method for managing power for a system that includes an energy storage system (ESS) and using the ESS to improve power efficiency of the system.

BACKGROUND

The use of Energy Storage Systems (ESS) has become a reality in subterranean operations. Poor engine management and operating generators outside of an optimal efficiency loading can result in excessive fuel usage, increased maintenance requirements, derating of equipment to handle excessive loads, wasteful disposal of regenerated energy, and excessive emissions during transients. Issues with the engine management can be attributed to the extreme power density of heavy equipment, such as a Drawworks (DW) or Top Drive (TD) on the drilling rig, cranes for dredging or strip mining, as well as other heavy-duty equipment (e.g., construction cranes, etc.) in technology areas other than oil and gas.

Using an ESS can provide better generator management by predicting the estimated load and planning the ESS/generator usage to meet this predicted load or ramping the equipment behavior as to naturally reduce its peak demand. The current art appears to be generally focused on a targeted approach, such as looking at comparing demand to generator supply or attempting to focus on a single piece of equipment such as the DW. While these approaches may reduce the loading of heavy equipment, they normally sacrifice performance for consistency, and suffer from a lack of responsiveness or predictability. Unfortunately, the slightest lack of responsiveness to a system load can result in the generators "seeing" the load and then reacting (or over-reacting) to it. Some of the peak can be shaved by that approach, but not eliminated.

Also, methods based on predictability can be bothersome to operations, for instance, automatically turning a generator off based on an algorithm can be misclassified or erroneous and generally not able to correctly address the complexity of human intentions or the nonlinear nature of certain operations such as tripping/drilling process, dredging, excavating; hoisting operations, etc. Therefore, improvements in power management are continually needed.

SUMMARY

This summary is provided to introduce a selection of concepts that are further described below in the detailed description. This summary is not intended to identify indispensable features of the claimed subject matter, nor is it intended for use as an aid in limiting the scope of the claimed subject matter.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for managing power of a system with an energy storage system (ESS). The method also includes coupling one or more loads of the system to a common direct current (DC) bus; measuring, via an ESS controller, a DC voltage of the common DC bus; estimating, via the ESS controller, an estimated nominal voltage (Vnom) for the common DC bus; and determining, via the ESS controller, a first DC voltage set point (DCSP) for each of one or more inverters based on the estimated Vnom, where the one or more inverters control a flow of DC current through the one or more inverters based on the first DCSP. Other embodiments of this aspect include corresponding computer systems, apparatus, and computer programs recorded on one or more computer storage devices, each configured to perform the actions of the methods.

One general aspect includes a method for managing power of a system with an energy storage system (ESS). The method also includes coupling one or more loads of the system to a common direct current (DC) bus; measuring, via an ESS controller coupled to a sensor, a DC voltage of the common DC bus; detecting, via the ESS controller, a change in the DC voltage; managing, via the ESS controller, a DC voltage set point (DCSP) for each of one or more inverters, where the one or more inverters are configured to control the DC current flowing through the one or more inverters based on the DCSP; and managing, via a controller, DC current flowing through one or more inverters coupled between the ESS and the common DC bus. Other embodiments of this aspect include corresponding computer systems, apparatus, and computer programs recorded on one or more computer storage devices, each configured to perform the actions of the methods.

BRIEF DESCRIPTION OF THE DRAWINGS

These and other features, aspects, and advantages of present embodiments will become better understood when the following detailed description is read with reference to the accompanying drawings in which like characters represent like parts throughout the drawings, wherein.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise.

The use of the word "about," "approximately", or "substantially" is intended to mean that a value of a parameter is close to a stated value or position. However, minor differences may prevent the values or positions from being exactly as stated. Thus, differences of up to ten percent (10%) for the value are reasonable differences from the ideal goal of exactly as described. A significant difference can be when the difference is greater than ten percent (10%). However, with exception to when a parameter value is set to "0" zero. In this case, the word "about," "approximately," or "substantially" is intended to mean that the parameter value is between −10 and +10 of the appropriate unit of measure for the parameter value.

Figure 1:
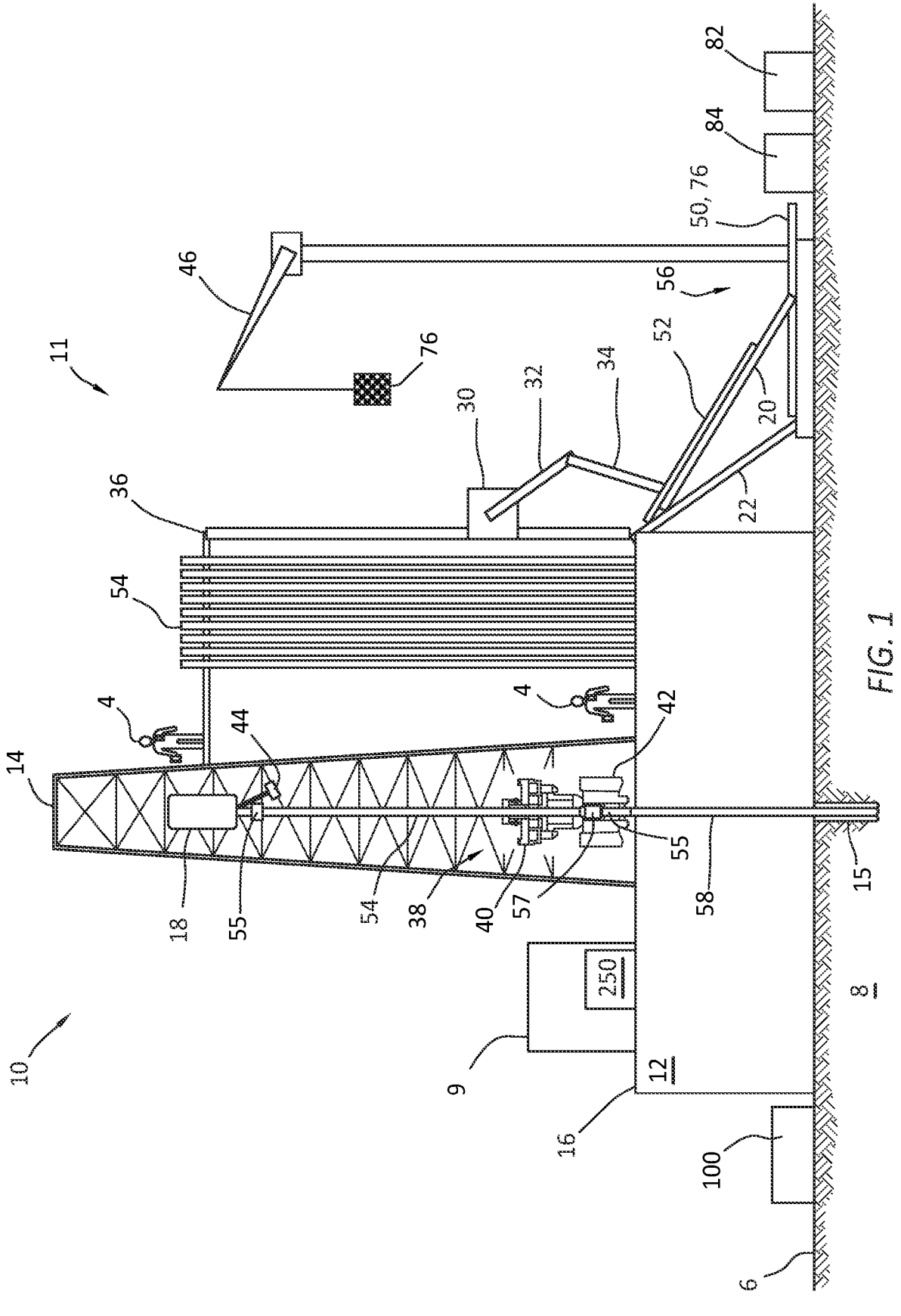
FIG. 1 is a representative simplified front view of a rig being utilized for a subterranean operation, in accordance with certain embodiments.

As used herein, "tubular" refers to an elongated cylindrical tube and can include any of the tubulars manipulated around a rig, such as tubular segments, tubular stands, tubulars, and tubular string, but not limited to the tubulars shown in FIG. 1. Therefore, in this disclosure, "tubular" is synonymous with "tubular segment," "tubular stand," and "tubular string," as well as "pipe," "pipe segment," "pipe stand," "pipe string," "casing," "casing segment," or "casing string."

FIG. 1 is a representative simplified front view of a rig 10 at a rig site 11 being utilized for a subterranean operation (e.g., tripping in or out a tubular string to or from a wellbore), in accordance with certain embodiments. The rig site 11 can include the rig 10 with its rig equipment, along with equipment and work areas that support the rig 10 but are not necessarily on the rig 10. The rig 10 can include a platform 12 with a rig floor 16 and a derrick 14 extending up from the rig floor 16. The derrick 14 can provide support for hoisting the top drive 18 as needed to manipulate tubulars. A catwalk 20 and V-door ramp 22 can be used to transfer horizontally stored tubular segments 50 to the rig floor 16. A tubular segment 52 can be one of the horizontally stored tubular segments 50 that is being transferred to the rig floor 16 via the catwalk 20. A pipe handler 30 with articulating arms 32, 34 can be used to grab the tubular segment 52 from the catwalk 20 and transfer the tubular segment 52 to the top drive 18, the fingerboard 36, the wellbore 15, etc. However, it is not required that a pipe handler 30 be used on the rig 10. The top drive 18 can transfer tubulars directly to and directly from the catwalk 20 (e.g., using an elevator coupled to the top drive).

The tubular string 58 can extend into the wellbore 15, with the wellbore 15 extending through the surface 6 into the subterranean formation 8. When tripping the tubular string 58 into the wellbore 15, tubulars 54 are sequentially added to the tubular string 58 to extend the length of the tubular string 58 into the earthen formation 8. FIG. 1 shows a land-based rig. However, it should be understood that the principles of this disclosure are equally applicable to off-shore rigs where "off-shore" refers to a rig with water between the rig floor and the earth surface 6.

When tripping the tubular string 58 out of the wellbore 15, tubulars 54 are sequentially removed from the tubular string 58 to reduce the length of the tubular string 58 in the wellbore 15. The pipe handler 30 can be used to remove the tubulars 54 from an iron roughneck 38 or a top drive 18 at a well center 24 and transfer the tubulars 54 to the catwalk 20, the fingerboard 36, etc. The iron roughneck 38 can break a threaded connection between a tubular 54 being removed and the tubular string 58. A spinner assembly 40 can engage a body of the tubular 54 to spin a pin end 57 of the tubular 54 out of a threaded box end 55 of the tubular string 58, thereby unthreading the tubular 54 from the tubular string 58.

When tripping the tubular string 58 into the wellbore 15, tubulars 54 are sequentially added to the tubular string 58 to increase the length of the tubular string 58 in the wellbore 15. The pipe handler 30 can be used to deliver the tubulars 54 to a well center on the rig floor 16 in a vertical orientation and hand the tubulars 54 off to an iron roughneck 38 or a top drive 18. The iron roughneck 38 can make a threaded connection between the tubular 54 being added and the tubular string 58. A spinner assembly 40 can engage a body of the tubular 54 to spin a pin end 57 of the tubular 54 into a threaded box end 55 of the tubular string 58, thereby threading the tubular 54 into the tubular string 58. The wrench assembly 42 can provide a desired torque to the threaded connection, thereby completing the connection.

While tripping a tubular string into and out of the wellbore 15 can be a significant part of the operations performed by the rig, many other rig tasks are also needed to perform a well construction according to a digital well plan. For example, pumping mud, via pump(s) 84, at desired rates, maintaining downhole pressures (as in managed pressure drilling), maintaining and controlling rig power systems, coordinating and managing personnel on the rig during operations, performing pressure tests on sections of the wellbore 15, cementing casing string in the wellbore, performing well logging operations, treating mud via a treatment system 82, as well as many other rig tasks.

A rig controller 250 can be used to control the rig 10 operations including an energy management system and controlling various rig equipment, such as the pipe handler 30, the top drive 18, the iron roughneck 38, the fingerboard equipment, imaging systems, various other robots on the rig 10 (e.g., a drill floor robot), or rig power systems 200. The rig controller 250 can control the rig equipment autonomously (e.g., without periodic operator interaction,), semiautonomously (e.g., with limited operator interaction such as initiating a subterranean operation, adjusting parameters during the operation, etc.), or manually (e.g., with the operator interactively controlling the rig equipment via remote control interfaces to perform the subterranean operation).

The rig controller 250 can include one or more processors with one or more of the processors distributed about the rig 10, such as in an operator's control hut 9, in the pipe handler 30, in the iron roughneck 38, in the fingerboard 36, in the imaging systems, in various other robots, in the top drive 18, at various locations on the rig floor 16 or the derrick 14 or the platform 12, at a remote location off of the rig 10, at downhole locations, etc. It should be understood that any of these processors can perform control or calculations locally or can communicate to a remotely located processor for performing the control or calculations. Each of the processors can be communicatively coupled to a non-transitory memory, which can include instructions for the respective processor to read and execute to implement the desired control functions, as well as methods described in this disclosure. These processors can be coupled via a wired or wireless network.

The rig controller 250 can collect data from various data sources around the rig (e.g., sensors, user input, local rig reports, etc.) and from remote data sources (e.g., suppliers, manufacturers, transporters, company men, remote rig reports, etc.) to monitor and facilitate the execution of a digital well plan. A digital well plan is generally designed to be independent of a specific rig, where a digital rig plan is a digital well plan that has been modified to incorporate the specific equipment available on a specific rig to execute the well plan on the specific rig, such as rig 10. Therefore, the rig controller 250 can be configured to monitor and facilitate the execution of the digital well plan by monitoring and executing rig tasks in the digital rig plan. The rig controller 250 can be configured to predict energy usage throughout execution of the digital rig plan, and control energy sources to support the energy needs of the rig or system.

Figure 2:
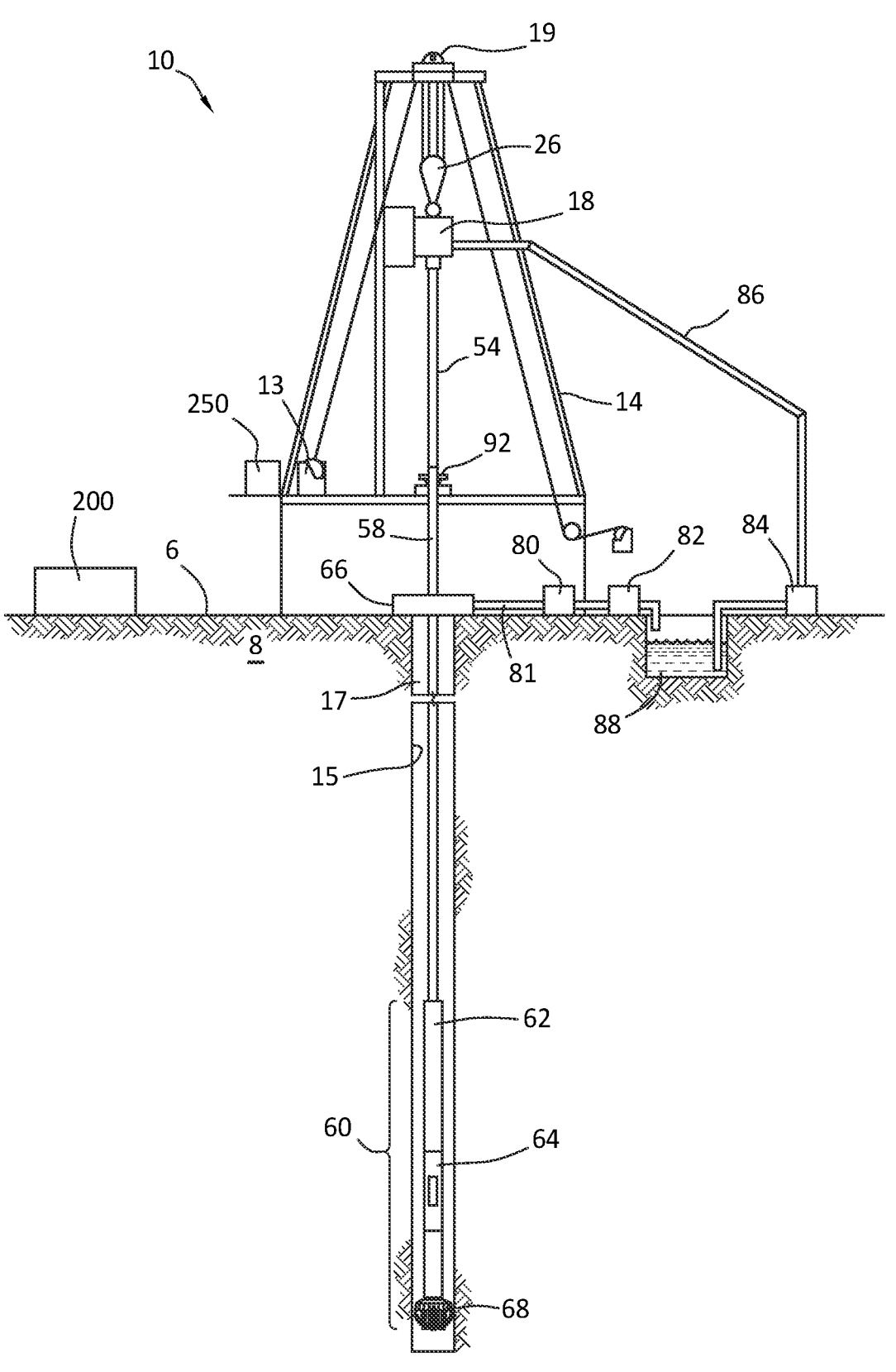
FIG. 2 is a representative partial cross-sectional view of another rig being utilized for a subterranean operation, in accordance with certain embodiments.

FIG. 2 is a representative partial cross-sectional view of a rig 10 being used to drill a wellbore 15 in an earthen formation 8. FIG. 2 shows a land-based rig, but the principles of this disclosure can equally apply to off-shore rigs, as well. The rig 10 can include a top drive 18 with a crown 19 and a traveling block 26 used to raise or lower the top drive 18. A derrick 14 extending from the rig floor can provide the structural support of the rig equipment for performing subterranean operations (e.g., drilling, treating, completing, producing, testing, etc.). The rig can be used to extend a wellbore 15 through the surface 6 and into the earthen formation 8 by using a tubular string 58 having a Bottom Hole Assembly (BHA) 60 at its lower end. The BHA 60 can include a drill bit 68 and multiple drill collars 62, with one or more of the drill collars including instrumentation 64 for LWD and MWD operations. During drilling operations, drilling mud can be pumped from the surface 6 into the tubular string 58 (e.g., via pumps 84 supplying mud to the top drive 18) to cool and lubricate the drill bit 68 and to transport cuttings to the surface via an annulus 17 between the tubular string 58 and the wellbore 15.

The returned mud can be directed to the mud pit 88 through the flow line 81 and the shaker 80. A fluid treatment 82 can inject additives as desired to the mud to condition the mud appropriately for the current well activities and possibly future well activities as the mud is being pumped to the mud pit 88. The pump 84 can pull mud from the mud pit 88 and drive it to the top drive 18 to continue circulation of the mud through the tubular string 58.

Sensors (including imaging sensors) can be distributed about the rig or downhole to provide information on the environments in these areas as well as operating conditions, health of equipment, well activity of equipment, fluid properties, weight on bit WOB, rate of penetration ROP, revolutions per minute RPM of the tubular string 58, RPM of the drill bit 68, health of the power system 200, voltages, currents, and frequencies of the power system 200, etc.

As the rig 10 is performing a subterranean operation according to a digital well plan or digital rig plan, a power requirement for operating the rig equipment at the rig site can be volatile with large power load peaks then returning to idle conditions. For example, when tripping a tubular string 58 out of the wellbore 15, each time the top drive 18 is raised by the drawworks 13 to raise the tubular string 58 the length of a pipe segment, a significant amount of power may be needed to operate the drawworks 13. However, when the tubular string 58 is lifted to the desired height, slips 92 on the rig floor 16 can be set to hold the weight of the tubular string 58 and the power to the drawworks 13 can be reduced, since it is no longer holding the weight of the tubular string 58. The other rig equipment (iron roughneck 38, pipe handler 30, etc.) can then be used to remove the pipe segment from the tubular string 58. The process can be repeated until at least a portion the tubular string 58 has been disassembled from the tubular string 58 and returned to a storage location.

This can be similar to the power requirements for large excavating equipment 400 (see FIG. 3) or dredging equipment 450 (see FIG. 4), which may require large power peaks when digging for and moving a bucket full of material but may require much less power when moving an empty bucket.

Using generators to supply power to the rig equipment (or other heavy duty equipment, such as large excavating equipment or dredging equipment), the number of generators online may be determined by the highest peak of power required by the power loads (electric pumps, electric motors, etc.). However, the generators that are needed for the max power requirement may not be utilized very efficiently when not supplying the peak power load. Energy storage systems (ESS) as described in this disclosure can be coupled to the power busses of these power systems to supply peak power loads and allow the generators to operate at substantially constant power, which can maximize their efficiencies. The ESS can also be used in power systems that draw source power from local utilities. By leveling out the power required from the utility power feeds, excess charges for peak loads can be minimized (or eliminated).

The ESS can store energy during times of low-power demand and deliver power to the power distribution system when a high-power demand is required. This disclosure provides a novel control system and methods for an ESS, which can include monitoring the common DC bus voltage and, based on the common DC bus voltage, controlling current flow between the ESS and a common DC bus by controlling a DC voltage set point for DC/DC inverters, and sending power to or receiving power from the common DC bus via the inverters.

Figure 3:
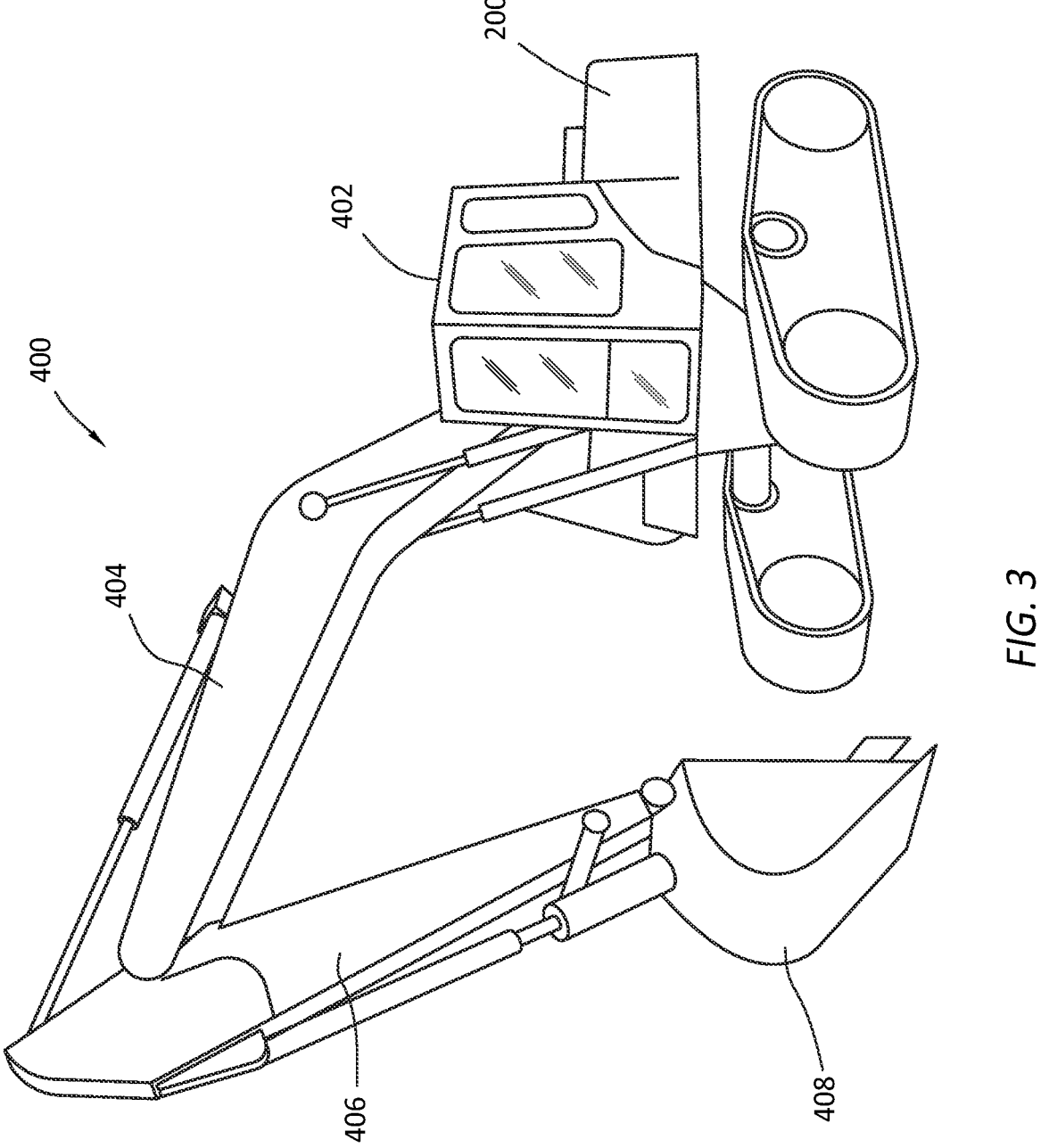
FIGS. 3 and 4 are representative example systems that may also benefit from a power system with an ESS, in accordance with certain embodiments.
Figure 4:
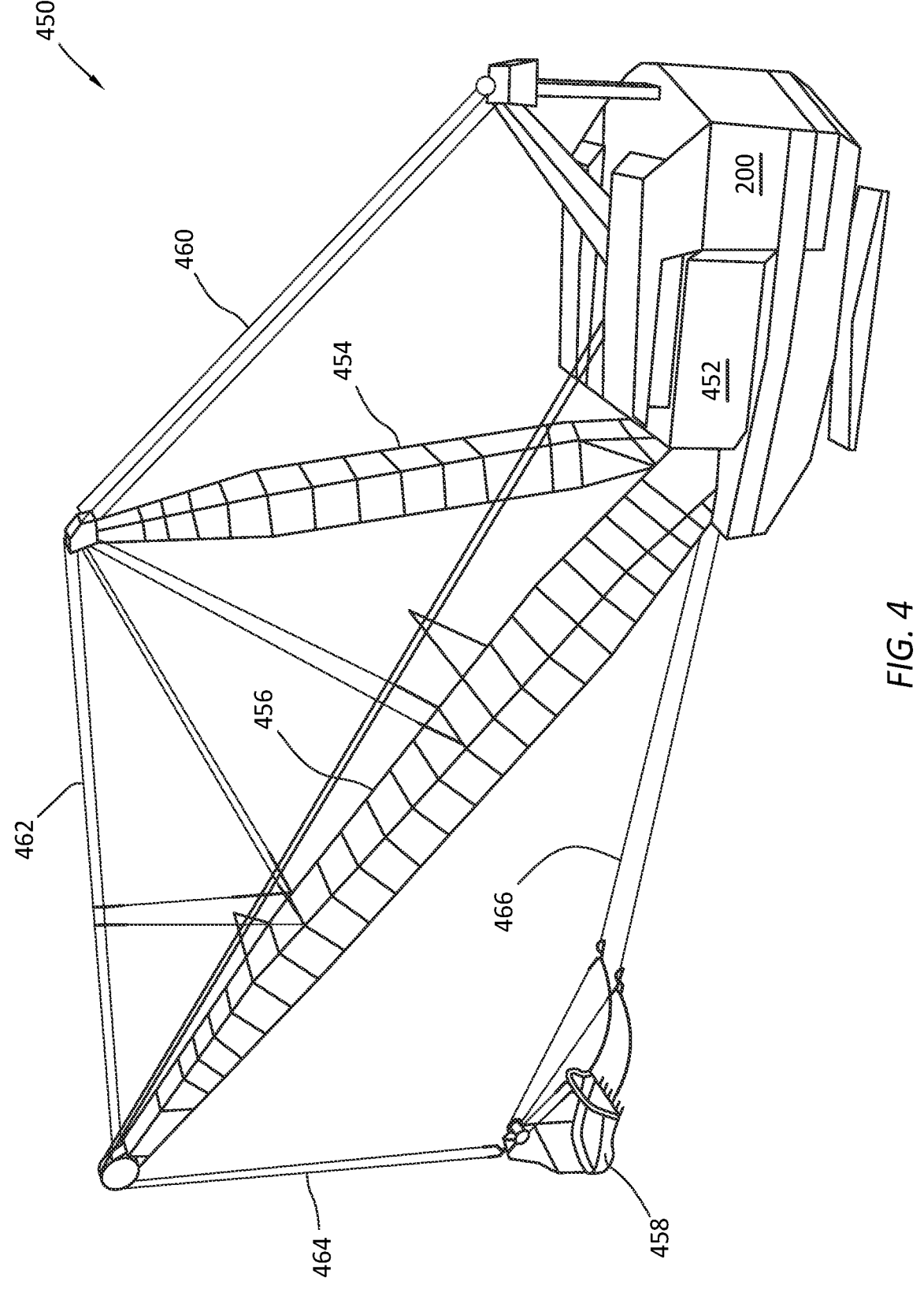

FIGS. 3 and 4 are representative example systems 400, 450 that may also benefit from a power system 200 with an ESS 300 contained within a respective chassis 402, 452. FIG. 3 shows an excavator 400 that can use an ESS 300 as described above to increase efficiency of the power system 200, by leveling out a load on the one or more generators 202 and storing power regenerated from lowering the arms 404, 406 and the bucket 408. The power system 200 can reduce emissions for the excavator 400.

FIG. 4 shows an excavator 450 that can use an ESS 300 as described above to increase efficiency of the power system 200, by leveling out a load on the one or more generators 202 and storing power regenerated from lowering the arms 454, 456 and the bucket 458 via manipulations of the cables 460, 462, 464, and 466. The power system 200 can reduce emissions for the excavator or dredging machine 450.

Figure 5:
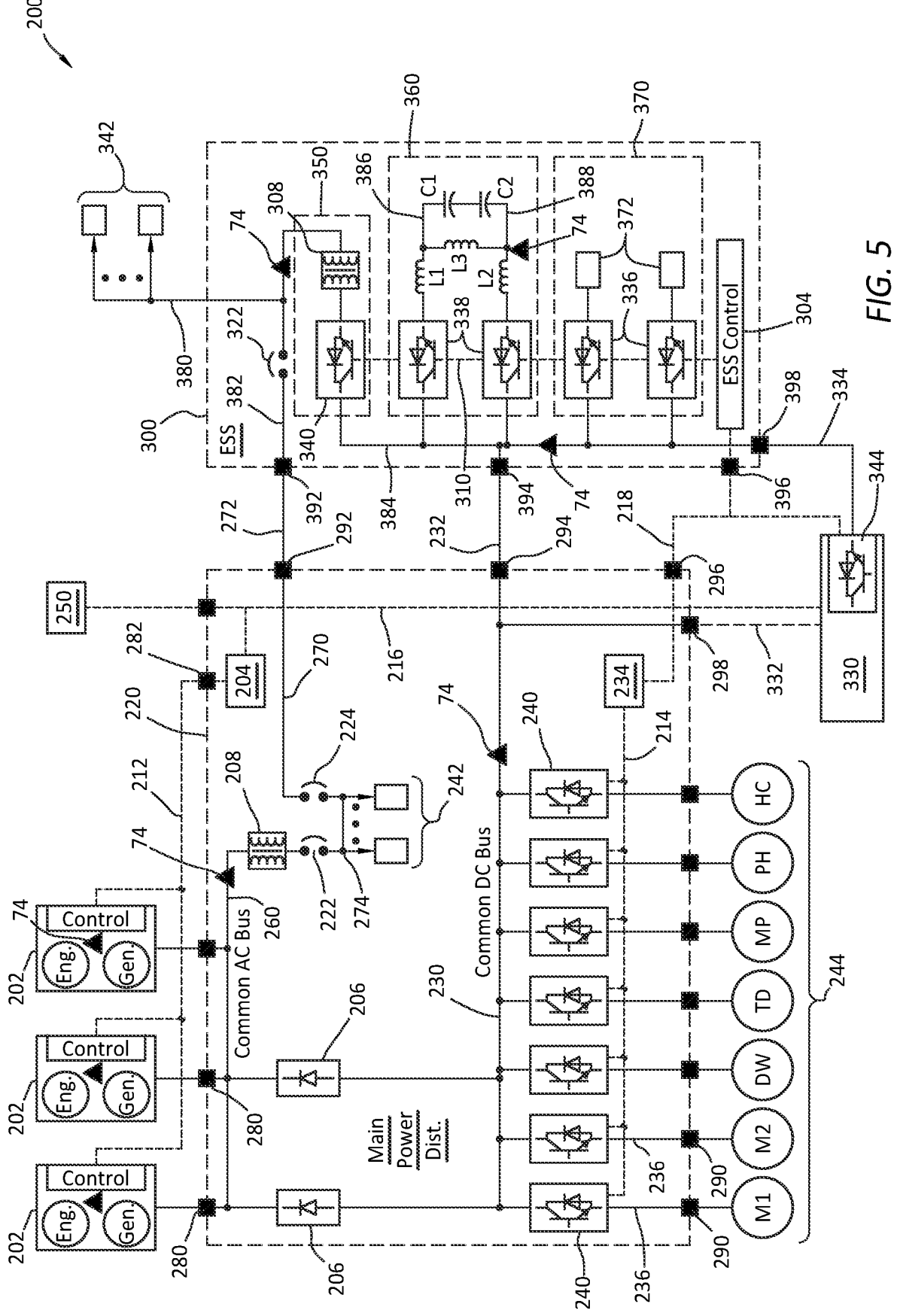
FIG. 5 is a representative circuit diagram of a power system with an energy storage system (ESS) for supplying power to augment a common direct current (DC) bus; in accordance with certain embodiments.

FIG. 5 is a representative circuit diagram of a power system 200 with an energy storage system (ESS) 300 that can supply power to augment a common direct current (DC) bus 230 or a common alternating current (AC) bus 260. The power system 200 can include one or more generators 202, a power distribution system (PDS) 220, and an energy storage system (ESS) 300. The PDS 220 can receive AC power from the generators 202 (or utility power) via connections 280, convert the AC power to DC power supplied to the common DC bus 230 via rectifiers 206, and convert DC power from the common DC bus 230, via inverters 240, to AC power that can be supplied to the main motor loads 244 via connections 290. The PDS 220 can connect the common DC bus 230 to a DC bus 384 in the ESS 300, as well as connecting an AC bus 270 to an AC bus 382 in the ESS 300. The power system 200 can receive input power from a utility power source instead of having the input power supplied by one or more generators 202. The systems and methods of this disclosure can level out the power supplied by the generators 202, or power received from a utility power source, or a combination thereof. As used herein, "inverter" refers to any device that performs power conversion between an input and an output bus. Therefore, an "inverter" can refer to an (AC/DC, AC/AC, or DC/DC) inverter, transformer, converter, power converter, rectifier, etc.

The power system 200 can include one or more generators 202 that are electrically connected in parallel to a common AC bus 260 in the PDS 220 and synchronize their AC phases and frequencies to supply power to the common AC bus 260. The rectifiers 206 can convert AC power from the common AC bus 260 and supply DC power to the common DC bus 230. The rectifiers 206 can be bi-directional, if desired. However, it may be preferred that the rectifiers 206 are unidirectional and transfer power only from the AC bus 260 to the DC bus 230. A bi-directional isolation transformer 208 can convert AC power from the common AC bus 260 to an AC voltage VAC (e.g., 480 VAC) on an AC bus 274 to power auxiliary loads 242 when the breaker 222 is closed. These auxiliary loads 242 can include electric start motors, various rig equipment, Heating, Ventilation, and Air Conditioning (HVAC), etc.

The bi-directional DC/AC inverters 240 can convert DC power from the common DC bus 230 to AC power supplied to a main load 244 via an AC bus 236. The main loads 244 can include dynamic break resistors (DBR), drawworks (DW) 13, a top drive (TD) 18, mud pumps (MP) 84, heave compensator (HC), a pipe handler (PH) 30, a crane 46, a catwalk 20, roughneck 38, AC motors M1 and M2, etc. The bi-directional DC/AC inverters 240 can also operate in an opposite direction by converting AC power on the bus 236 into DC power delivered to the common DC bus 230. This can be beneficial when one of the main loads changes from consuming power to producing power, which can be called regenerative power. For example, when a drawworks 13 is unwinding to lower the top drive 18, the unwinding can cause the DW motors to generate AC power onto the AC bus 236, which can be converted to DC power by the inverter 240 and supplied to the common DC bus 230. The regenerated power can be directed to charging energy storage devices in the ESS 300 or powering other equipment or components of the rig 10 that are electrically coupled to the common DC bus 230. A variable frequency drive (VFD) controller 234 can be used to control the inverters 240 for converting power between the common DC bus 230 and an AC bus 236. The controller 234 can be a portion of the rig controller 250 or can be separate from the rig controller 250 and communicatively coupled to the rig controller 250.

The common DC bus 230 can be connected to the DC bus 384 in the ESS 300 via connections 294, 394 and DC bus 232. These and other connections described in connecting the power system 200 components can be quick connect/disconnect type connectors or they can be removable connections, such as using a fastener and a lug connection. The DC bus 384 can electrically couple the common DC bus 230 to the inverters 336, 338, 340 in the ESS 300. An ESS controller 304 can be a portion of the rig controller 250 or can be separate from the rig controller 250 and communicatively coupled to the rig controller 250. The ESS controller 304 can be communicatively coupled to the controller 234, the generator controller 204, and the inverters 336, 338, 340, via control lines 212, 214, 216, 218, 310 which can represent either wired or wireless communications. The ESS controller 304 can coordinate with the controllers 204, 234 to manage power distribution in the power system 200. The controllers 204, 234, 304 can each receive sensor data from various sensors 74 disposed throughout the power system 200 to monitor conditions of the power system 200 components and initiate actions based on the sensor data.

FIG. 5 shows at least some of the possible locations for sensors 74 used to collect sensor data from components of the power system 200 (such as the common DC bus 230, the common AC bus 260, the generators 202, energy storage devices C1, C2, AC bus 380, etc.). However, it should be understood that more or fewer of the sensors 74 can be disposed within the power system 200 at various locations, such as monitoring health of the power system components, environmental conditions, etc. The power system 200 can also receive sensor data from other sensors 74 disposed about the rig site 11, or receive communications based on the sensor data from the rig controller 250 (or at least other portions of the rig controller 250).

In a non-limiting embodiment, the ESS 300 can supply DC power to the common DC bus 230 thereby discharging the energy storage devices C1, C2 or receive DC power from the common DC bus 230 to charge the energy storage devices C1, C2 or dump power to the load bank resistors 372 to dissipate excess energy. The ESS 300 can receive AC power from the common AC bus 260 via breakers 222, 224, 322 and AC buses 270, 272, 274, 380, 382, and deliver AC power to the auxiliary loads 242, 342 via the breakers 224, 322 and AC buses 270, 272, 274, 380, 382. The ESS 300 can deliver AC power to the common AC bus 260 via the breakers 222, 224, 322, AC buses 270, 272, 274, 380, 382, the isolation transformer 308, and the DC/AC inverter 340. The energy storage devices C1, C2 can be capacitors, supercapacitors, ultracapacitors, high-speed batteries, or combinations thereof. Batteries can be combined with one or more of the types of capacitors to provide more types of energy storage, but some battery types may not be able to supply an amount of instantaneous power that may be required to augment power to the common DC bus 230 or the common AC bus 260 as types of capacitors can. However, some high-speed batteries newly developed appear to mimic the characteristics of capacitors with high charge and discharge rates. As used herein, a "supercapacitor" or "ultracapacitor" refers to a high-capacity capacitor with a capacitance value much higher than other capacitors such as electrolytic capacitors, but with lower voltage limits. It can typically store 10 to 100 times more energy per unit volume or mass than electrolytic capacitors and can accept and deliver charge much faster than batteries, other than possible high-speed batteries.

In a non-limiting embodiment, the power system 200 can operate as described in the following paragraphs. At startup, when none of the generators 202 are energized and need to be started, DC power from the energy storage devices C1, C2 can be supplied to the auxiliary loads 242 or 342 to power an electric start motor that can be used to start one or more of the generators 202. This can be achieved via the ESS controller 304 selecting that DC power from the energy storage devices C1, C2 be supplied to the DC bus 384 via inverters 338. The ESS controller 304 can control the inverter 340 to receive DC power from the DC bus 384, convert it to AC power, and supply the AC power to the isolation transformer 308. The isolation transformer 308 can adjust the AC voltage from the inverter 340 to the AC voltage of the AC bus 380. The AC power from the isolation transformer 308 can drive the auxiliary loads 342 which are electrically coupled to the AC bus 380. Additionally, if the breakers 322 and 224 are closed, the AC power can be transmitted through the AC buses 382, 272, 270, 274 to power one or more of the auxiliary loads 242. The generator controller 204 can coordinate with the ESS controller 304 to facilitate getting power to the electric start motors and energizing one or more of the generators 202 via the electric start motors.

When one or more of the generators 202 are energized (e.g., a diesel, gas, or dual fuel generator engine driving a generator component of the generator 202), the one or more of the generators 202 can supply AC power to the common AC bus 260. Typically, the generators 202 can supply 480 VAC, 600 VAC, or 690 VAC power to the common AC bus 260. However, other voltages can be supplied by the generators in keeping with the principles of the current disclosure. One or more of the generators 202 can also supply power to the auxiliary loads 242 via a closed breaker 222 and the isolation transformer 208, which can adjust the voltage from the common AC bus 260 to the required voltages to power the auxiliary loads 242. These auxiliary loads 242 can include one or more electric start motors that can be used to start one or more of the unenergized generators 202. Generator controller 204 can be used to control operation of the generators 202.

The rectifiers 206 can convert AC power from the common AC bus 260 to DC power to energize the common DC bus 230. With the common DC bus 230 energized, the VFD controllers 234 can selectively control the individual inverters 240 to power one or more of the main loads 244. At this point, operations (e.g., as rig operations on a rig 10, excavating operations on an excavator 400, dredging operations on a dredging machine 450, excavating operations on the dredging machine 450, etc.) can be performed.

Alternatively, or in addition to, the ESS 300 may not be sufficiently charged to provide power to the power system to perform the startup procedures, such as starting at least one of the generators 202. In this scenario, a portable energy storage system (PESS) 330 can be used, at least temporarily, to supply the necessary power to the power system 200 to perform the startup procedures. The PESS 330 can be one or more banks of energy storage devices (e.g., capacitors, supercapacitors, ultracapacitors, high speed batteries, batteries, flywheel, or combinations thereof) mounted to one or more bases or skids to facilitate transport via a conveyance vehicle (such as a truck, an 18-wheeler rig, etc.). The base can be small enough to be transported by a standard 4-wheel vehicle, such as a base that supports energy storage devices for starting generators 202 on an excavator 400 or dredging machine 450, or the base can be one or more skids that can support energy storage devices for starting generators 202 on an oil rig 10.

Once the startup procedures or complete, the PESS 330 can be disconnected and shipped to another location for starting up another power system 200 or shipped to a storage facility. However, the PESS 330 can also remain connected and can be used to augment the ESS 300. The PESS 330 can be provided by a third party that supplies a charged PESS 330 to a site to support startup procedures and then removes the PESS 330 when the startup is complete. The PESS 330 can work in tandem with the energy storage devices C1, C2, if one or more portions of the energy storage devices C1, C2 are out of service. In this configuration, the PESS 330 can be controlled by the ESS controller 304, such as via network communication through line 218, to support the functions of the ESS 300.

The ESS 300 can include load bank resistors (LBRs) 372 that can receive power from the DC bus 384 via the inverters 336 and dissipate the power in the LBRs 372. This can be useful if the energy storage devices C1, C2 are fully charged and the DC bus 384 has excess power which can raise the DC voltage on the DC bus 384 and thus the common DC bus 230. The inverters 336 can be controlled by the ESS controller 304 to dump the excess power to the LBRs 372. It can be noted that at least one of the main loads 244 can be a dynamic brake resistor module (DBR) that can also be used to dissipate excess power from the common DC bus 230. This dissipated power is lost via heat generated in the DBR, but this may be necessary to prevent the voltage of the common DC bus 230 from increasing past an undesirable level, which can prevent damage to the system. The waste heat can be captured and utilized for energy needs on the rig or other systems.

In a non-limiting embodiment, the ESS 300 includes energy storage devices C1, C2 which can be used to store large quantities of energy and deliver that energy back to the power distribution system 220 as needed to provide DC power to the common DC bus 230 to power at least a portion of one or more of the main loads 244 during peak power requirements. The energy storage devices C1, C2 can also supply power to the common AC bus 260 by supplying DC power to the DC bus 384 via the inverters 338 (which can be controlled by the ESS controller 304), supplying power through the inverter 340, through the isolation transformer 308, and through the isolation transformer 208 to the common AC bus 260 (with breakers 222, 224, and 322 closed). The inductors L1-L3 are representatively configured as shown to stabilize the energy being received at the energy storage devices C1, C2 or the energy as it is being transmitted from the energy storage devices C1, C2 over the DC buses 386, 388.

The ESS controller 304 can control operation of the breakers 222, 224, 322 to facilitate routing energy to the desired AC or DC buses. However, the ESS controller 304 can also work in cooperation with the generator controller 204 or the VFD controllers 234 to operate the breakers 222, 224, 322, as needed, or the ESS controller 304 can work in cooperation with other portions of the rig controller 250 to operate the breakers 222, 224, 322.

In a non-limiting embodiment, connections 292, 392, 294, 394, 296, 396 and lines (or buses) 272, 232, 218 can be used to electrically couple the ESS 300 with the PDS 220. These connections can include quick disconnect connectors to allow for quicker assembly or disassembly of the power system 200. The ESS 300 can be mounted on one or more skids that can be used to transport one or more portions of the ESS 300 when moving the power system 200 to a new site, such as moving a rig 10 from a current rig site 11 to a new rig site 11. However, the connections can also be hardwired connections where assembly and disassembly are not driving design requirements. In these cases, such as with large excavators 400 or dredging machines 450, the ESS 300 can be installed with removable connections, such as with fasteners and lugs.

In a non-limiting embodiment, typical voltages for the common AC bus 260 can range from approximately 480 VAC up to approximately 690 VAC for low voltage rigs 10, and approximately 4160 VAC for medium voltage rigs 10 when supplied by the generators 202. The voltage of the common AC bus 260 can be approximately 480 VAC, approximately 600 VAC, approximately 690 VAC, or approximately 4160 VAC. When power is supplied to the AC bus 260 from utility power feeds, then the utility power determines the VAC ranges and the PDS 220 can be adapted to accommodate the utility power feeds.

In a non-limiting embodiment, typical voltages for the AC buses 270, 272, 274, 382, 380 can be approximately 480 VAC, 600 VAC, or 690 VAC for low voltage rigs 10 and approximately 4160 VAC for medium voltage rigs 10 for powering auxiliary loads 242, 342 on or off the rig 10 or on large excavators or dredging machines 400, 450.

In a non-limiting embodiment, typical voltage for the common DC bus 230 can range from approximately 650 VDC up to approximately 975 VDC for supplying power to the main loads 244 and the ESS 300. Voltages for the common DC bus 230 can be greater than 650 VDC, greater than 655 VDC, greater than 660 VDC, greater than 665 VDC, greater than 670 VDC, greater than 675 VDC, greater than 680 VDC, greater than 820 VDC, greater than 825 VDC, greater than 830 VDC, greater than 835 VDC, greater than 840 VDC, greater than 845 VDC, greater than 850 VDC, greater than 940 VDC, greater than 945 VDC, greater than 950 VDC, or greater than 955 VDC. Voltage for the common DC bus 230 can be less than 975 VDC, less than 970 VDC, less than 965 VDC, less than 960 VDC, less than 955 VDC, less than 950 VDC, less than 945 VDC, less than 940 VDC, less than 850 VDC, less than 845 VDC, less than 840 VDC, less than 835 VDC, less than 830 VDC, less than 825 VDC, less than 820 VDC, less than 680 VDC, less than 675 VDC, less than 670 VDC, less than 665 VDC, or less than 660 VDC.

Therefore, voltage for the common DC bus 230 can range from greater than 650 VDC and less than 975 VDC, greater than 650 VDC and less than 680 VDC, greater than 820 VDC and less than 850 VDC, greater than 945 VDC and less than 975 VDC, greater than 680 VDC and less than 820 VDC, greater than 850 VDC and less than 920 VDC, greater than 650 VDC and less than 670 VDC, greater than 820 VDC and less than 840 VDC, or greater than 945 VDC and less than 965 VDC, or any other combinations.

In a non-limiting embodiment, typical voltages for the AC buses 236 can range from approximately 480 VAC to approximately 690 VAC for low voltage rigs 10 and approximately 4160 VAC for medium voltage rigs 10 for delivering power to the main loads 244 [e.g., dynamic break resistors (DBR—not shown), drawworks (DW) 13, a top drive (TD) 18, mud pumps (MP) 84, a heave compensator (HC), a pipe handler (PH) 30, a crane 46, a catwalk 20, roughneck 38, AC motors M1, M2, etc.].

In a non-limiting embodiment, the ESS controller 304, the rig controller 250, or one or more other controllers (e.g., controllers 204, 234) can manage power on the DC bus 230, 384 by monitoring the DC voltage via one or more sensors 74. The DC voltage on the DC bus 230, 384 is generally very noisy and can cause fluctuations in power supplied from or power received by the ESS 300 in response to the DC voltage being above or below a desired DC voltage. As used herein, the "desired DC voltage" is a DC voltage setpoint (DCSP) provided to the inverters 338. If the DC voltage drifts below the DCSP, then the inverters 338 can transfer power from the ESS 300 to the DC bus 230 to raise the DC voltage toward the DCSP. If the DC voltage drifts above the DCSP, then the inverters 338 can transfer power from the DC bus 230 to the ESS 300 (or LBRs 372) to lower the DC voltage toward the DCSP.

A controller 390 of the inverters 338 (see FIG. 7A) can be generally configured to detect an error between the actual DC voltage and the DCSP and to control power flow between the ESS 300 and the DC bus 230 to maintain the DC voltage substantially at the DCSP. As used herein, "DC voltage" refers to the voltage of the common DC bus 230. As the DC voltage drifts away from the DCSP, then the ESS controller 304 (or another controller, as mentioned above) can react by controlling power flow through the inverters 338 between the ESS 300 and the DC bus 230 to correct the detected error. This can be seen as a "stiff control" of the inverters 338.

As used herein, "stiff control" means that the DCSP is a settable fixed value and the inverters 338 (via a control feedback loop or other control mechanisms) continually (or at least periodically via random or set time intervals) compare the measured DC voltage to the DCSP and control power flow through the inverters 338 to correct the error.

As used herein, "soft control" means that the DCSP can be adjusted by the ESS controller 304 to manage current flow through the inverters 338. By setting the DCSP to a value that is away from a desired DCSP value (i.e., the DCSP value that forces the optimum response of the inverters 338 to meet the power needs of the common DC bus 230), the ESS controller 304 can limit current flow through the inverters 338, cause excess current flow through the inverters 338 (e.g., to charge the ESS 300, to pre-load the common DC bus 230 with power, etc.), or dampen current flow through the inverters 338. Adjusting the DCSP away from the desired DCSP can be restricted to when the DC voltage is within a Neutral Zone and there is not a power event occurring on the common DC bus. A power event can occur during the DCSP adjustments, but the response of the ESS 300 to meet a power need may be delayed from optimal, where the optimum response is seen as transferring instantaneous power through the inverters 338 to maintain the DC voltage at the DCSP value. When a power event occurs or the DC voltage drifts outside of the Neutral Zone, then the ESS controller 304 can return the DCSP to the desired DCSP and leave the inverters under "stiff" control.

The common DC bus 230 can be powered by the generators 202 via the rectifiers 206, or via regenerated power from the loads 244, or from power supplied by the ESS 300 via DC/DC inverters 338. To supply power from the ESS 300, the inverters 338 can receive the DCSP from a controller (e.g., 304). The controller 390 of the inverters 338 can be a feedback controller that forces the DC voltage toward the DCSP.

Therefore, if the actual DC voltage goes higher than the DCSP, then a controller 390 can extract power from the common DC bus 230 (via bus 384) in an attempt to reduce the DC voltage of the DC bus 230 back to the DCSP. Alternatively, if the actual DC voltage goes lower than the DCSP, then the controller 390 can deliver power to the DC bus 230 (via bus 384) in an attempt to raise the DC voltage on the DC bus 230 back to the DCSP.

Figure 6:
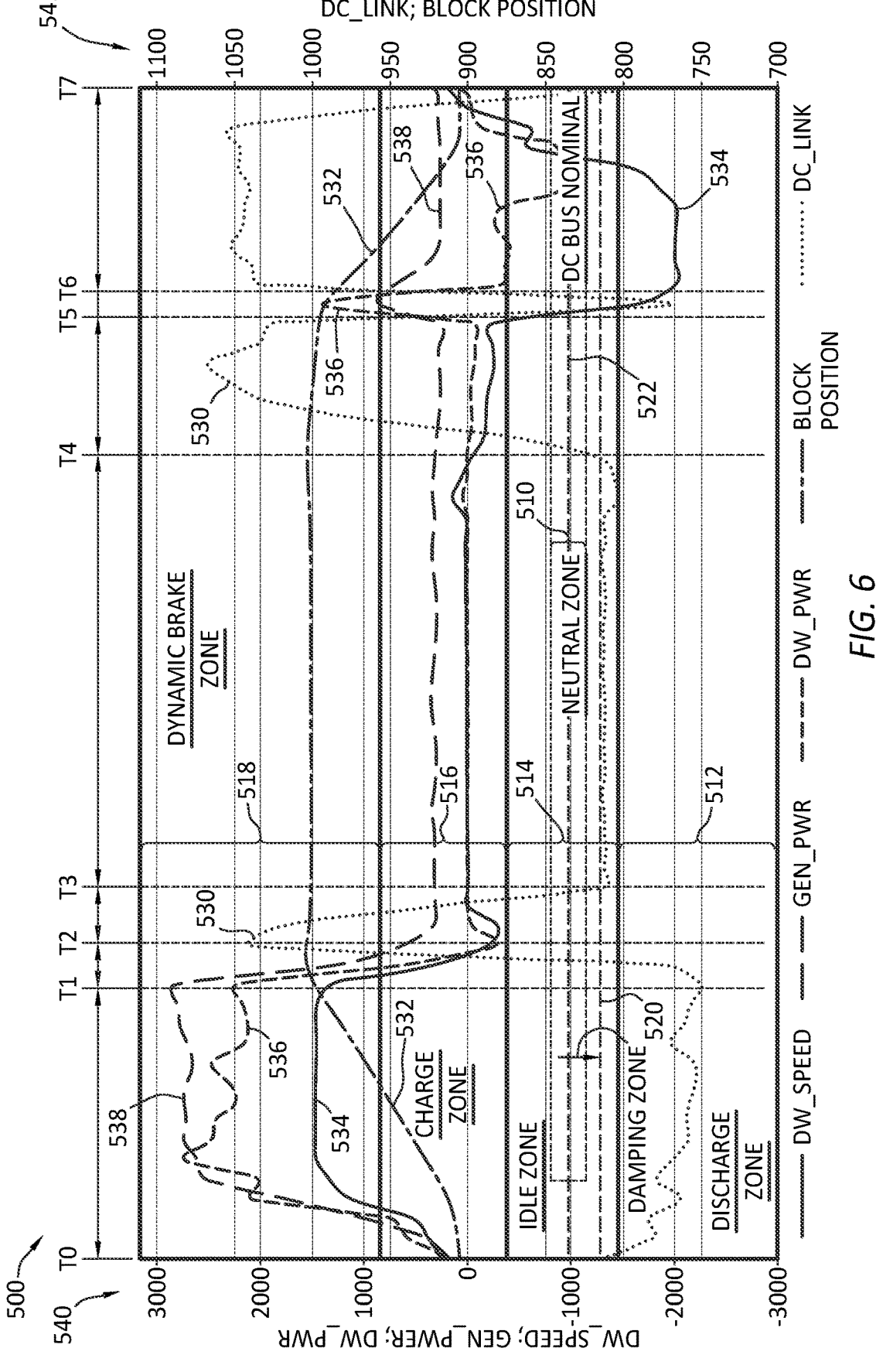
FIG. 6 is a representative plot of example power signals as well as DC bus voltage zones, which are used to characterize DC bus states, in accordance with certain embodiments.

FIG. 6 is a representative plot 500 of example power signals as well as DC voltage signals and DC bus voltage zones, in accordance with certain embodiments. For illustration purposes, the left vertical axis 540 of the plot 500 ranges from +3000 to −3000, which can be used to plot kW power for a drawworks DW (signal 536), a generator 202 (signal 538), and a DC link (signal 530). The +/−3000 range can also be used to plot RPMs of the DW (e.g., signal 534). For illustration purposes, a block position signal 532 is also plotted based on a distance of a traveling block from the rig floor as a function of time.

The signals 530, 532, 534, 536, 538 can be representative of a top drive 18 hoisting a tubular string 58 out of a wellbore 15, pausing the vertical movement of the tubular string 58 for a short time, and then lowering the tubular string 58 back down into the wellbore 15. The DC link (signal 530) is representative of the DC voltage of the common DC bus 230 without an ESS 300 available to assist in maintaining the DC voltage within the Idle Zone. Using an ESS 300, as described in this disclosure, to augment power requirements of the common DC bus 230, the DC link (signal 530) would remain in the Idle Zone of the DC voltage the majority of the time. The signal 532 shows the traveling block in a vertical ascent beginning at time T0 and moving upward until time T1. This upward movement of the traveling block (and thus the tubular string 58) causes the RPMs of the DW speed (signal 534) to ramp up until the DW reaches a target rotational speed. The DW power (signal 536) increases to accommodate the increased speed of the DW and then generally levels out once the DW reaches its target rotational speed.

Due to the power increase of the DW, the power from the generator(s) 202 is increased to accommodate the increased power load of the DW. In certain embodiments, the required power from the generator 202 can be reduced by providing power from the ESS 300 to the common DC bus 230 to augment the power from the generator(s) 202. However, in this example, a dip in power of the DC link (signal 530) from time T0 through time T1 is seen. These signals can be representative of a DW raising a top drive 18 and hoisting the tubular string 58 at least partially out of the wellbore 15.

At time T1, the traveling block is preparing to stop its upward movement. As is demonstrated by the signals 530, 532, 534, 536, 538, even stopping the DW from continuing to hoist the top drive 18 can cause a significant amount of power to be regenerated by the DW and top drive 18. The generator power (signal 538) drops off sharply from time T1 and to time T2, as does the DW power (signal 536). The DW speed (signal 534) is also ramping down, which can cause regenerated power seen by the DC link (signal 530) due to increased voltage and current supplied to the common DC bus 230. The DC link (signal 530) reaches its peak at time T2 due to the ramping down of the DW. The DW speed appears to overshoot the "0" zero RPM mark and rebound back to the "0" RPM mark.

By time T3, the generator power (signal 538), the DW power (signal 536), the DW speed (signal 534), and the block position (signal 532) have leveled out to steady state values generally until time T4, where the rig 10 appears to begin the process of lowering the tubular string 58 into the wellbore 15. The DW speed (signal 534) increases slightly just before time T4, but then starts unwinding (i.e., DW speed going negative) to begin lowering the top drive 18, and thus the tubular string 58. Since the DW is unwinding, it can be regenerating power that is delivered to the DC bus 230. Due to the regenerated power, the generator power (signal 538) is at a low power steady state, and the DW power (signal 536) can be substantially "0" zero, with minimal power required to lower the tubular string 58. The DC link (signal 530) is most affected by the regenerated power by increasing to over 1050 Volts DC (VDC) on the DC bus 230.

Between times T5, T6, the generator power (signal 538) and the DW power (signal 536) appear to spike upward, and the DC link (signal 530) spikes downward indicating that the common DC bus 230 is supplying power to the DW while the DW is ramping to a target unwind speed. Between times T6, T7, the DW power (signal 536) goes negative due to regenerated power, and the DC link increases back up around 1050 VDC. As the DW continues to lower the tubular string 58 into the wellbore 15, the DC link remains at a high voltage (e.g., greater than 1000 VDC). Near a midpoint between times T6, T7, the DW speed (signal 534) begins to slow, presumably slowing the decent of the tubular string 58 in anticipation of the drill bit 68 being lowered near (or on) the bottom of the wellbore 15. As the DW speed (signal 534) reaches "0" zero RPMs, the other signals 530, 532, 536, 538 return to steady state values with the rig being idle.

With reference to the right vertical axis 542, it shows VDC values ranging from 700 VDC to 1100 VDC for the DC link (or DC bus 230) voltage. The voltage levels are allocated into various zones, with each zone accounting for a portion of the overall range of the right vertical axis 542. The voltage ranges of the zones in FIG. 6 are representative of the zone voltages, but the zones are not limited to these voltage ranges.

If the DC link voltage falls below a predetermined value (e.g., 805 VDC), then the DC link can be seen to be in a Discharge zone 512. The Discharge zone 512 is where the voltage of the DC bus 230 is below a predetermined value and the ESS controller 304 can transfer power through the inverters 338 to the DC bus 230 while the DC bus 230 remains below the predetermined value, such as 805 VDC.

If the DC link voltage (or DC voltage) is between, for example, 805 VDC and 875 VDC, then the DC link can be seen to be in an Idle zone 514. The Idle zone indicates that operations on the rig 10 or idle and minimal power is required during this time.

If the DC link voltage (or DC voltage) is between, for example, 875 VDC and 955 VDC, then the DC link can be seen to be in a Charge zone 516. The Charge zone indicates that operations on the rig 10 are supplying excess power (e.g., regenerated power) or the rig 10 is not utilizing available power from the generators 202 and this excess power can be directed to the ESS 300 to charge the energy storage devices C1, C2. If the energy storage devices C1, C2 are fully charged, then the excess power may be dissipated via load bank resistors 372 (see FIG. 5).

If the DC link voltage rises above a predetermined value (e.g., 955 VDC), then the DC link can be seen to be in a Dynamic Brake zone 518. The Dynamic Brake zone 518 indicates that the DC link voltage is at or above a point that corrective action may be needed, and the ESS controller 304 may not be able to transfer enough power to the ESS 300 to consume the available energy on the DC bus 230. Therefore, the excess power can be dissipated via the load bank resistors 372, as well as any other energy dissipating devices.

Within the Idle zone 514 can a sub-zone which can be referred to as a Neutral zone 510. If the nominal DC voltage (Vnom) 522 is within the Idle zone 514, then the Neutral zone 510 can be seen as a zone in which the current through the inverters 338 is substantially "0" zero. The Neutral zone 510 can be a +/–range about the Vnom.

The Dampening zone 520 is a VDC value that is below the DC Bus Nominal Voltage, but still within the Idle zone 514. In the Idle zone 514, but below the Dampening zone 520, the ESS controller 304 can adjust the DCSP to reduce the ramp rate of current through the inverters 338 to reduce the optimal desired response of the system subject to a power event.

Figure 7A:
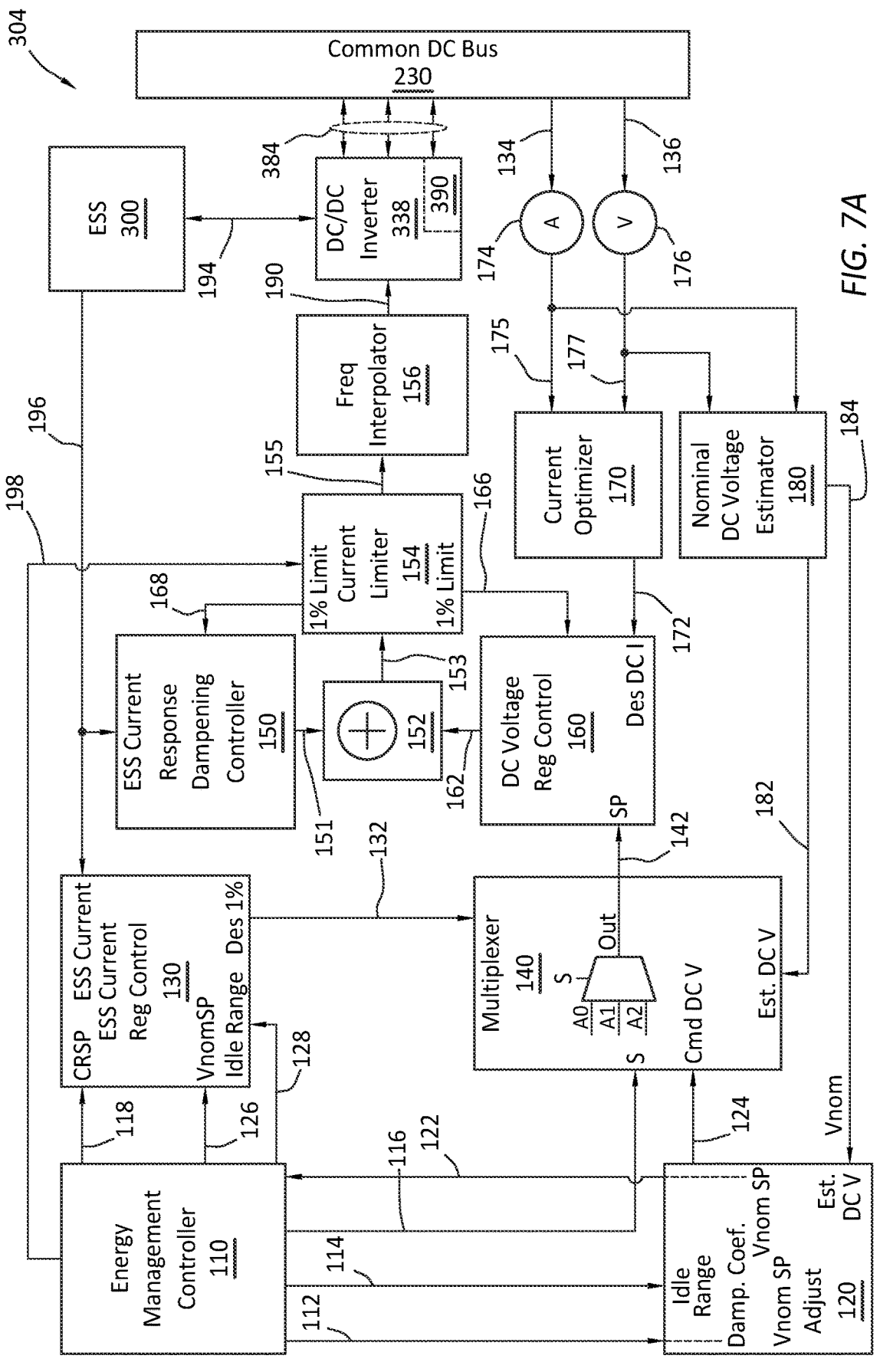
FIGS. 7A and 7B are representative functional block diagrams for an energy management system of the ESS controller 304, in accordance with certain embodiments.
Figure 7B:
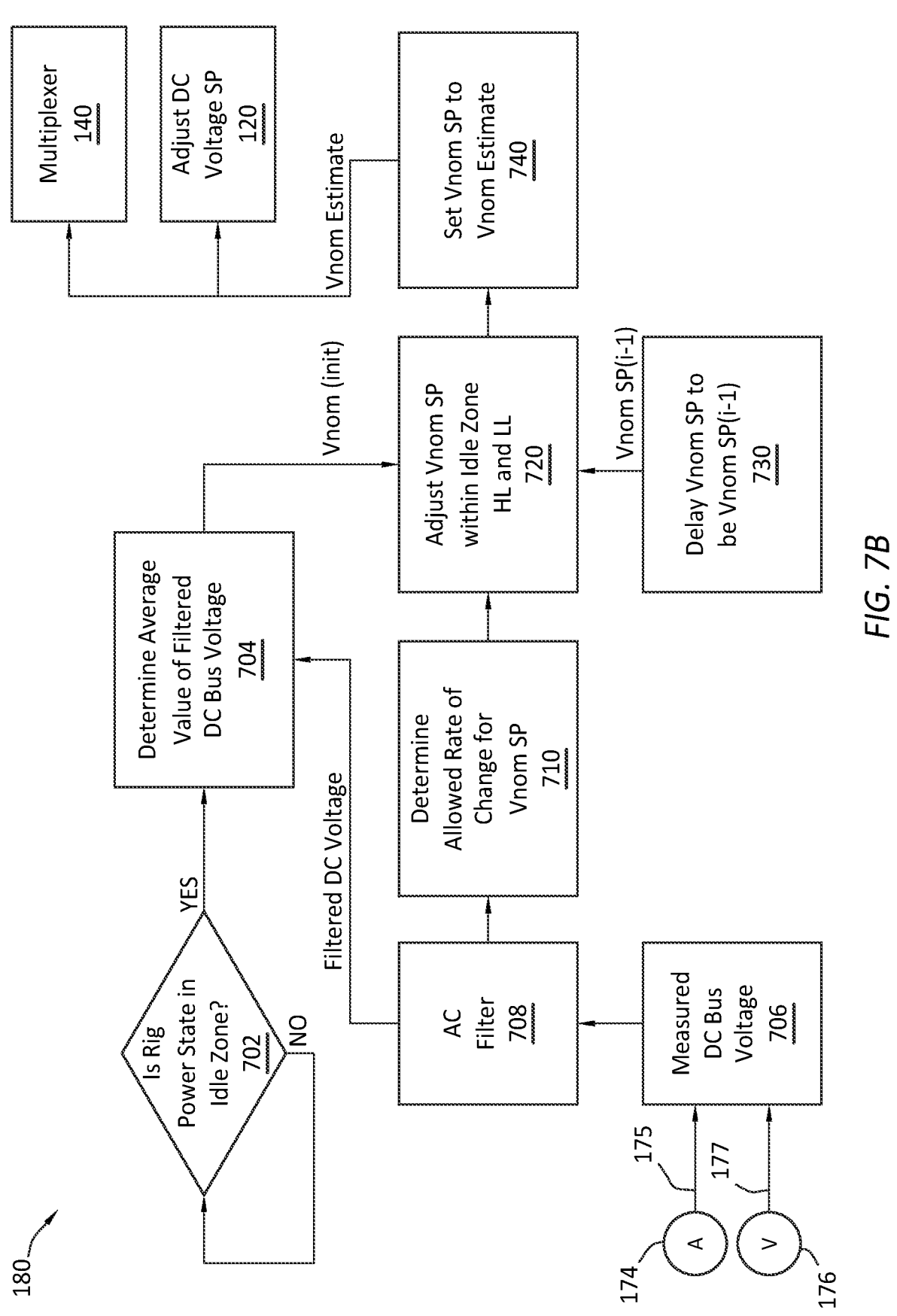

FIGS. 7A and 7B are representative functional block diagrams for an energy management system (EMS) of the ESS controller 304, in accordance with certain embodiments. The EMS controls regulation of the DC Bus by enabling/disabling control elements, dynamically estimating loop parameters and power states/events, determining DC bus zones, protecting equipment, and providing a mechanism to optimize the energy available to mitigate DC Bus disturbances, which can include dampening an optimum response. The EMS controls the transfer of energy between the ESS 300 and the common DC bus 230 by controlling the value of the DC voltage set point (DCSP) 190 that is received by the inverters 338. As briefly discussed above, the DCSP indicates the desired DC voltage for the DC bus 230, and the inverters 338 transfer energy (control current flow through the inverters 338) to adjust the DC voltage toward the DCSP and minimize errors between the DCSP and the DC voltage.

The EMS can serve as a barrier to protect equipment and dynamically limit an output current based on several constraints such as the number of energy storage devices online, the number of DC bus cables used, a State of Charge (SOC) of the ESS 300, as well as user configured limits. The EMS can also determine a plurality of criteria primarily driven by power events and ESS 300 SOC to select between various modes of operations illustrated in FIG. 6, which can include the Idle zone, nominal DC Bus Voltage (Vnom) Estimation, virtual loading, dampening a response to disturbance on the DC bus 230, ramping a response, capturing regeneration of energy, DC load compensation, and combinations thereof.

The ESS controller 304 can be configured to collect machine information from digital interfaces and instruments, and can coordinate desired machine responses. The ESS controller 304 can include a Human Machine Interface (HMI) by which an operator can directly or remotely provide user input or user control of the EMS, such as to start/stop the EMS, monitor performance via key performance indicators (KPI), diagnose issues, initiate emergency stops, generate reports, or combinations thereof.

Referring now to FIG. 7A, the ESS controller 304 can monitor the common DC bus 230 via sensors 74, such as via an ammeter 174 monitoring a sense line 134 or via a voltmeter 176 monitoring a sense line 136. It should be understood that the sense lines 134, 136 can be a single sense line. Measured amperage and voltage data can be provided to the current optimizer module 170 and to the nominal DC voltage (Vnom) estimator module 180 via lines 175, 177, respectively. The ammeter measurements can measure current on the load side of the common DC bus 230 and can provide information on fuel consumption, available generator power, DC bus 230 power factor, power limiting events, equipment statuses, etc. The measured amperage or voltage data can be analyzed by the current optimizer module 170 to determine if a disturbance (e.g., a load change) is occurring on the DC bus 230 and to estimate an amount of current that may be needed to optimize the DC voltage at the Vnom value. The desired DC current (DesDCI) can be communicated from the current optimizer 170 to the DC Voltage Regulator Control module 160 via line 172. The current optimizer 170 can determine a desired normalized current based on the DesDCI.

The Vnom of the common DC bus 230 can vary, even in the Idle zone 514. Therefore, the actual Vnom value is needed to accurately control the ESS 300 and the inverters 338. The measured amperage or voltage data can be analyzed by the Vnom estimator module 180 to determine an estimated Vnom of the DC bus 230 and to provide the estimated Vnom value (EstDCV) to other modules, such as providing the EstDCV to the multiplexer module 140 and to the Vnom SP adjustment module 120 that adjusts (or forces) EstDCV to a value within a range in which the DCVP is allowed to vary, such as in the Idle zone 514 or the Dampening zone 520.

The Energy Management Control module (EMC) 110 can provide a dampening coefficient and an Idle voltage range to the Vnom SP adjustment module 120, which can use this information to adjust the Vnom SP to the EMC module 110, which can deliver it to the ESS Current Regulator Control module 130. The Vnom SP adjustment module 120 can output (via line 124) a commanded DC voltage (CmdDCV) to the multiplexer module 140, which can use the CmdDCV to determine a desired set point for the DC Voltage Regulator Control module 160. The multiplexer module 140 can be controlled by the EMS to select between various voltage set points and output the selected voltage SP to the DC Voltage Regulator Control module 160 (via line 142) for determination of the intermediate DC voltage SP (IDCSP), which is output to the summation module 152 via line 162.

The ESS Current Regulator Control module 130 can receive a current reference set point CRSP (via line 118), the Vnom SP (via line 126), and a voltage range defining the Idle zone 514, from the EMC module 110. The ESS Current Regulator Control module 130 can include a sliding mode controller (SMC) that can supply a desired target current percentage (a value between –100% and +100%) to the multiplexer module 140, which can use the desired target current percentage (DesI %) to adjust the voltage SP output to the DC Voltage Regulator Control module 160 (via line 142). The SMC can be used to detect the actual nominal DC voltage (Vnom) of the DC bus 230 by determining which DC voltage causes the average ESS 300 current in lines 194 to be substantially "0" zero. With the DC bus 230 in the Neutral zone 510, the SMC can use the CRSP as a control input and the actual ESS 300 current (via line 196) as a feedback variable. With the CRSP set to "0" zero, the SMC can adjust the desired target current percentage (DesI %) to indirectly cause the DCSP supplied to inverters 338 to be adjusted. As the DesI % is adjusted, the ESS 300 current will change based on the changes to the inverters 338 control.

The EMC module 110 can vary the DesI % over a range of values that will at some point cause the ESS 300 current to be substantially "0" zero. The EMC module 110 may overshoot the mark and cause the ESS 300 current to reverse directions. The EMC module 110 can then reverse the change direction of the DesI % value in response to the reverse current detected. Varying the DesI % may change directions several times as the ESS 300 current swings from between positive and negative flow directions. The final value for DesI % is the value that results in substantially "0" zero ESS 300 current, since the CRSP is set to "0" zero. The SMC can use this iterative process to determine the actual nominal DC voltage (Vnom) of the DC bus 230 at any time when the DC bus 230 is in the Neutral zone 514. The ESS Current Regulator Control module 130 will supply the final value for DesI % to the multiplexer module 140 that will use it to output a desired voltage SP to the DC Voltage Regulator Control module 160 (via line 142).

In addition, the SMC can also be used to provide a "virtual load" to the ESS 300, by setting the CRSP to a non-zero value. Since the SMC will operate to cause the ESS 300 current to track to the CRSP, then if the CRSP is set to +100 amps input to the ESS 300 from the DC bus 230 (e.g., to charge the ESS 300), then the SMC can adjust the DesI % output to the multiplexer module 140 a desired amount to cause the ESS 300 current to be 100 amps flowing into the ESS 300 from the DC bus 230. This can be referred to as virtual loading, since the ESS controller 304 is pulling energy from the DC bus 230 without there being any additional actual load.

If the CRSP were set to −100 amps, then the SMC can adjust the DesI % output to the multiplexer module 140 to cause the ESS 300 current to be 100 amps flowing from the ESS 300 to the DC bus 230. This can be referred to as load transfer, since the ESS controller 304 causing more energy to be delivered from the ESS 300 to the DC bus 230 than is caused by the normal control parameters. It should be understood that the "+" or "−" prefixes for the ESS current, is arbitrary. In this disclosure, a "+" or "positive" amperage for the ESS current indicates current flowing into the ESS 300, while a "−" or "negative" amperage for the ESS current indicates current flowing out of the ESS 300.

A Current Limiter module 154 can determine a current limit for the ESS 300 based on the SOC of the ESS 300, the DC cables (i.e., bus 384 connections) coupling the ESS 300 to the DC bus 230, the number of energy storage devices that are online, and user configured limits. Based on the desired current (DesDCI) received (via line 172) from the current optimizer module 170, the current limit received (via line 166) from the Current Limiter module 154, and the selected voltage SP received from the multiplexer module 140, the DC Voltage Regulator Control module 160 can determine an intermediate DCSP (IDCSP) to send to the summation module 152 (line 162).

The DC Voltage Regulator Control module 160 can be configured to request, via the IDCSP value, the maximum current available to address the detected disturbance on the DC bus 230. However, if applying the available maximum current at one time is not desirable, then the Response Dampening Controller module 150 can be used to slow the transfer of current through the inverters 338 by offsetting the IDCSP value from the DC Voltage Regulator Control module 160 by an offset value output (via line 151) to the summation module 152 to limit the rate of change of the DCSP 190 to the inverters 338. As the Response Dampening Controller module 150 allows the DCSP to be ramped to the IDCSP value, the Response Dampening Controller module 150 can set the offset value output (line 151) to "0" zero and allow the output (line 153) of the summation module 152 to substantially equal the IDCSP value after the slowed ramp up is accomplished.

The resultant sum of the offset value output (line 151) and the IDCSP value from the DC Voltage Regulator Control module 160 can be output (via line 153) to the Current Limiter module 154, which can ensure that the resultant sum does not exceed the current limits of the ESS 300 and the inverters 338. The Current Limiter module 154 can output the final value (via line 155) for the DCSP, to be used to control the inverters 338, to a Frequency Interpolator module 156 that can interpolate the DCSP value to a pulse train frequency.

After passing through the Current Limiter, the normalized current percentage target can be interpolated to frequency, by creating a pulse train of a desired frequency to be delivered to the inverters 338. However, this frequency interpolation is optional, in that the DCSP 190 can be delivered to the inverters 338 via digital communication. However, there are some benefits to interpolating the DCSP 190 to a pulse train and delivering the pulse train to the inverters 338. Some inverters 338 allow for the use of a high frequency pulse train to deliver the DCSP 190 at a much faster, and more robust rate than most digital forms of communication.

In a non-limiting embodiment, referring now to FIG. 7B, the Vnom estimator module 180 can receive the measured current and voltage at module 706 from the DC bus 230 via sensors 174, 176 via lines 175, 177 respectively. The voltage signal from the module 706 can be filtered in module 708 to remove AC components, so more accurate processing of the voltage signal can proceed. The filtered voltage signal can be output to both modules 704, 710. Module 710 can use a filter (e.g., a low pass filter) to determine an allowed rate of change for the nominal DC voltage set point, and output that allowed rate of change to the module 720.

In module 702, the ESS controller 304 can determine a power state of the rig 10 and determine if the rig power state is within the Neutral zone 510 of the DC bus 230. If the rig power state is in the Neutral zone 510, then the module 704 can determine an average value of a filtered DC bus 230 voltage from module 708 and set an initial nominal DC voltage (initial Vnom), which is output to the module 720. The module 720 adjusts the Vnom SP such that it is between a high limit (HL) and a lower limit (LL) of the Idle zone 514 based on the allowed rate of change of the Vnom SP, the initial Vnom, and the previous Vnom SP (Vnow(i−1)). The resulting Vnom SP can be set as the Vnom estimate (i.e., EstDCV), which is output to the multiplexer module 140 and the Vnom SP adjustment module 120.

Figure 8A:
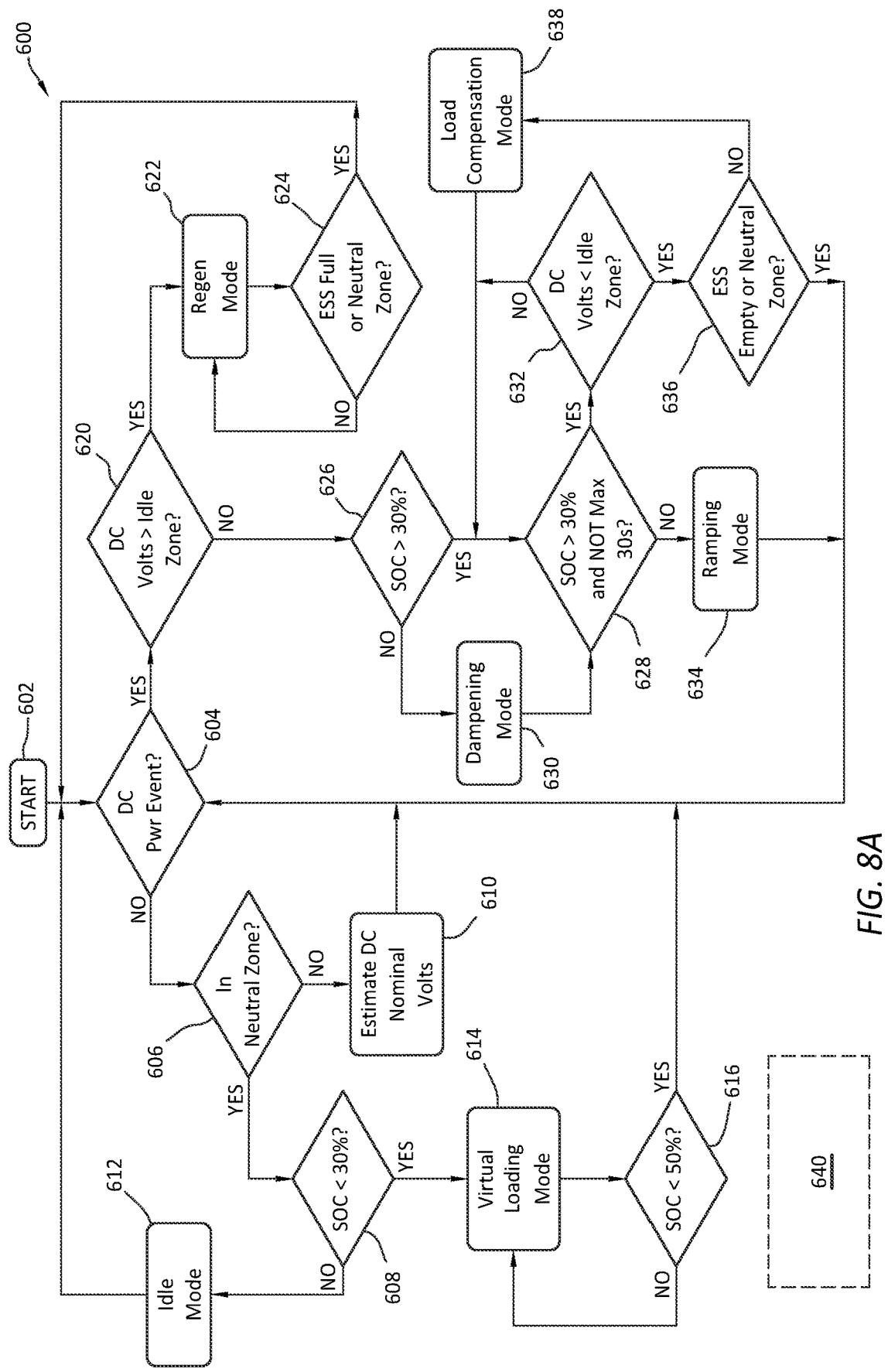
FIGS. 8A and 8B are representative flow diagrams for a method 600 for operating an energy management system via an ESS controller 304, in accordance with certain embodiments.
Figure 8B:
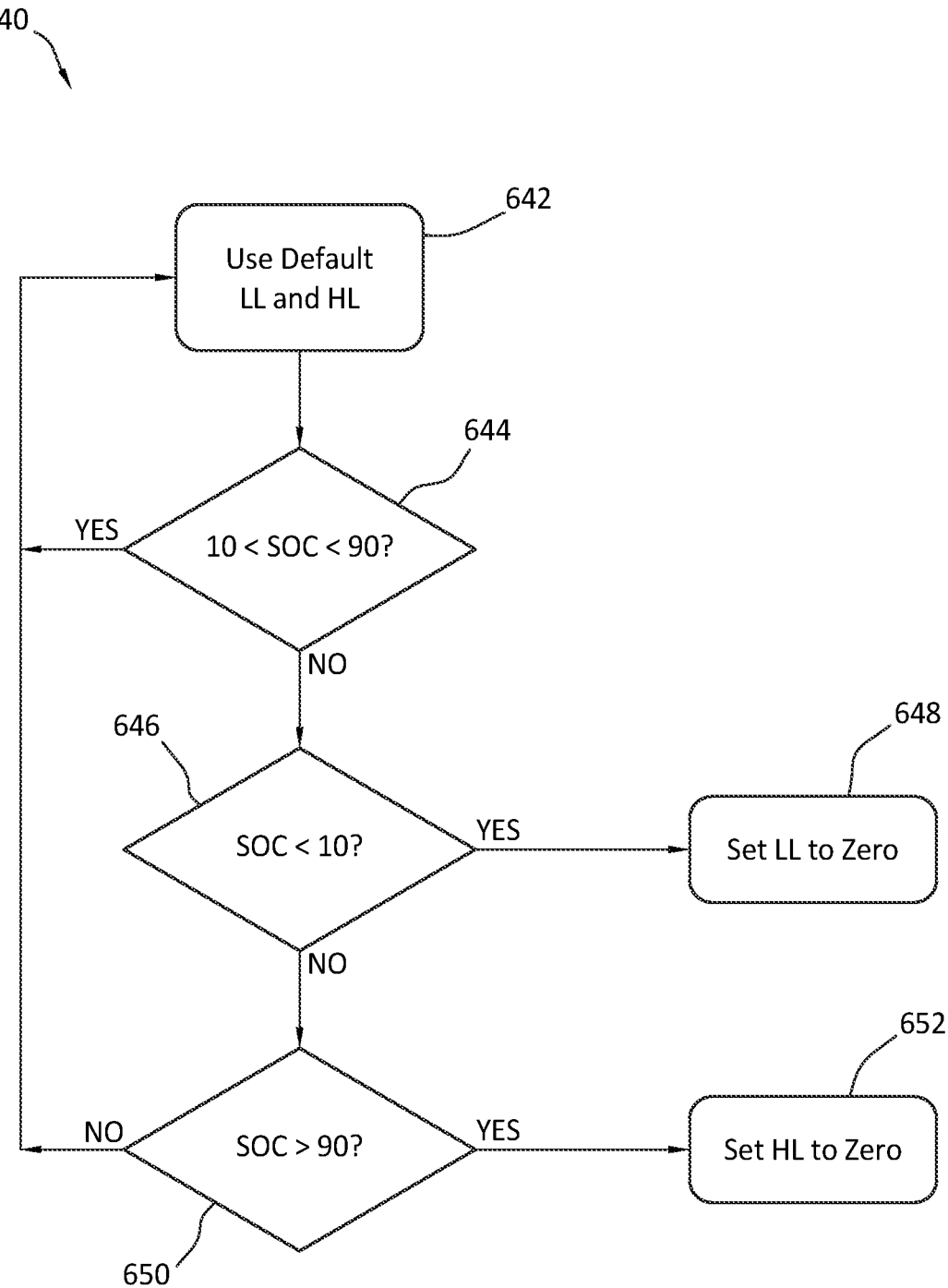

FIGS. 8A and 8B are representative flow diagrams for a method 600 for operating an energy management system in the ESS controller 304, in accordance with certain embodiments. The method 600 can be seen as a state machine for controlling the managing the energy of the ESS 300. The EMC module 110 is primarily driven by the detection of power events, established DC Bus Zones and the SOC of the online energy storage devices C1, C2. The state machine can be decomposed into several modes, which can be defined as:

1) A Regen Mode where excess power from the DC Bus 230 is absorbed by the energy storage devices C1, C2, and the inverters 338 are allowed to behave optimally to maintain its Nominal Voltage (Vnom), while other controllers are turned OFF, 2) A Load Compensation Mode, where the power needed by the DC Bus 230 is supplied by the energy storage devices C1, C2 and the inverters 338 are allowed to behave optimally to maintain its Vnom, while other controllers are turned OFF, 3) A Dampening Mode, where the Dampening controller 150 is allowed to apply current corrections to the DCSP to the inverters 338 to "soften" a desired response to a load disturbance, which allows for a sub-optimum response with the goal of managing energy reserves where an appropriate damping coefficient [0-100%] can be determined (e.g., via a fuzzy logic controller) based on the SOC of the energy storage devices C1, C2, and possibly additional information from operations, for example such as rig activity and history, power limiting statuses, and various other measurements that can give an indication on the likelihood of the severity of future/current power disturbances, 4) A DC Bus Nominal Voltage Estimation Mode, where the ESS Current Regulator controller is turned ON with a set point (SP) of "0" zero. The DC Bus Voltage is recorded as nominal using a running mean when in the Neutral zone 520 and no disturbances are present, 5) An Idle Mode, where the DC Voltage regulator control module 160 is allowed to behave optimally to maintain the Vnom, while other controllers are turned OFF, 6) A Virtual Loading Mode, used to recharge the energy storage devices C1, C2 from an operation's power source by using the ESS Current Regulator Control module 130 with a SP of 100 amps as input to the DC Voltage Regulator Control module 160. Normally, the SP to the DC Voltage Regulator Control module 160 is set to maintain the DC bus voltage at the DCSP. However, when the ESS controller 304 wants to charge the ESS 300, the ESS Current Regulator Control module 130 can be instructed to deliver a SP to the DC Voltage Regulator Control module 160 that is higher than the normal DCSP. By indicating that more power is needed than is actually needed (i.e., virtual loading), the inverters 338 deliver extra power to the ESS 300 which can be used to charge the energy storage devices C1, C2, and 7) A Ramping Mode where the DC Voltage Regulator Control module 160 response is reduced to "0" zero by turning the ESS Current Regulator Control module 130 ON with a SP of "0" zero current.

The method 600 can begin with operation 602 that starts the state machine. In operation 604, the state machine determines whether the DC bus 230 is undergoing a power event (e.g., a regen event, a chopping event, a discharging event, etc.). If that is not the case, the state machine in operation 606 will check whether the DC bus 230 is operating in the Neutral zone 510. If the DC bus 230 is operating outside the Neutral zone 510, then the Vnom estimator module 180 can be engaged in operation 610. If the DC bus 230 is operating inside the Neutral zone 510, then the state controller can check whether the SOC of the ESS 300 is less than a desired percentage (e.g., 30%) in operation 608. In operation 616, if the ESS 300 SOC is less than the desired percentage (e.g., 30%, 40%, 33%, etc.), then the Virtual Loading mode can be engaged in operation 614 at least until the ESS 300 SOC climbs back up to at least an arbitrary threshold (e.g., 50% SOC). In operation 616, if the ESS 300 SOC is equal to or greater than the desired percentage (e.g., 50%, 60%, 65%, etc.), then the state controller can return to operation 604 and continue monitoring for DC power events. In operation 608, if the ESS 300 SOC is equal or greater than the desired percentage (e.g., 30% SOC) and no power event is detected, then the Idle mode in operation 612 can be enabled to respond to any DC bus 230 disturbance optimally.

If a power event should occur at any point in time (per operation 604, which continues to monitor the DC bus 230), then the state machine can check which DC Bus Zone threshold has been exceeded. In operation 620, if the DC voltage is greater than the high limit (HL) of the Idle Zone 514, then the Regen mode can be enabled in operation 622, with operation 624 determining when the disturbance is fully resolved or the desired ESS 300 SOC is met, where the state machine would then return to operation 604.

In operation 620, if the DC Voltage is below the lower limit (LL) of the Idle Zone 514 and a power event is occurring, then in operation 626 the state controller can check whether the ESS 300 SOC is greater than an arbitrary threshold (e.g., 30% SOC). If the ESS 300 SOC is less than the arbitrary threshold, then a Dampening Mode can be engaged in operation 630 for an arbitrary max duration (such as 30 seconds), whether it is exceeded can be verified in operation 628. After exceeding the max duration, the Ramping Mode can be engaged in operation 634 and the state machine can return to operation 604 to continue monitoring for power events.

If a power event occurs during operation 628 and the arbitrary max duration is not yet exceeded, the state machine can proceed to operation 632 that checks to see if the DC voltage is less than the lower limit (LL) of the Idle zone 514. If the DC voltage is not less than the lower limit (LL) of the Idle zone 514, the state machine can return to operation 628. If the DC voltage is less than the lower limit (LL) of the Idle zone 514, then the state machine can proceed to operation 636, where the state machine can check whether the ESS SOC is below an arbitrary threshold or the DC voltage is in the Neutral zone 510. If the ESS is not less than an arbitrary threshold (e.g., 30%, 35%, 40%, 20%, 25%) and the DC voltage is not within the Neutral zone 510, then the state machine can proceed to engaging the Load Compensation Mode in operation 638. The Load Compensation Mode is used to deliver power immediately to a common DC bus 230 load (e.g., a drawworks DW), when the ESS has enough stored power to support the load. Operations 632, 636, 638 can continue to repeat until the ESS SOC is less than the arbitrary threshold or the DC voltage is in the Neutral zone 514 (i.e., the disturbance goes away). If either of these conditions are met, then the state machine can return to operation 604 to continue monitoring for power events. As stated, the state machine continues to look for power events at any point in the method 600.

Referring now to FIG. 8B, the method 640 can be used to monitor the ESS 300 SOC and determine if the high and low limits (HL, LL) should be adjusted to protect the ESS. In operation 642, the HL and LL can be set based on the criteria used by the Current Limiter module 154 to restrict ESS current to ensure safe operation based on the constraints of the system, such as SOC of the ESS 300, the DC cables (i.e., bus 384 connections) connecting the ESS 300 to the DC bus 230, the number of energy storage devices that are online, and user configured limits. In operation 644, the state machine can determine if the ESS 300 SOC is within an arbitrary range (e.g., greater than 10% and less than 90%). If so, the state machine can return to operation 642. If not, the state machine may proceed to operation 646 that can check to see if the ESS 300 SOC is less than 10%. If so, the state machine can proceed to operation 648 and set the lower limit (LL) to be "0" zero. If not, the state machine can proceed to operation 650 that can check to see if the ESS 300 SOC is greater than 90%. If not, the state machine can return to operation 642. If so, the state machine can proceed to operation 652 and set the high limit (HL) to be "0" zero.

The HL and LL limits are set to "0" zero to prevent overly discharging or oversupplying the ESS. For example, setting the HL limit to "0" zero can prevent a power regeneration event, that might command 50% current, from occurring since it would be forcibly set to a max of "0" zero when the ESS is overcharged (e.g., SOC greater than 90%). Similarly, if 50% current is needed by the rig 10 from the ESS and the ESS SOC is less than 10%, so power output from the ESS can be capped at "0" zero to prevent damaging ESS.

VARIOUS EMBODIMENTS

Embodiment 1. A method for managing power of a system with an energy storage system (ESS), the method comprising:

coupling one or more loads of the system to a common direct current (DC) bus;

measuring, via an ESS controller, a DC voltage of the common DC bus;

estimating, via the ESS controller, an estimated nominal voltage (Vnom) for the common DC bus; and determining, via the ESS controller, a first DC voltage set point (DCSP) for each of one or more inverters based on the estimated Vnom, wherein the one or more inverters control a flow of DC current through the one or more inverters based on the first DCSP.

Embodiment 2. The method of embodiment 1, further comprising:

measuring, via the ESS controller, a change in the DC current; and determining, via the ESS controller, that a power event is occurring on the common DC bus.

Embodiment 3. The method of embodiment 1, wherein the estimating further comprises determining, via the ESS controller, that the ESS is in a neutral power state, wherein the neutral power state refers to when an average of the DC current flowing through the one or more inverters is substantially zero.

Embodiment 4. The method of embodiment 3, wherein the estimating further comprises iteratively changing, via the ESS controller, an initial DCSP for each of the one or more inverters until the average of the DC current flowing through the one or more inverters is substantially zero and setting the first DCSP to substantially equal a value of the initial DCSP that causes the average of the DC current flowing through the one or more inverters to be substantially zero.

Embodiment 5. The method of embodiment 1, determining a second DCSP that forces a predetermined amount of power to be transferred between the ESS and the common DC bus.

Embodiment 6. The method of embodiment 5, wherein the second DCSP causes the predetermined amount of power to be transferred from the ESS to the common DC bus, which is referred to as load sharing.

Embodiment 7. The method of embodiment 5, wherein the second DCSP causes the predetermined amount of power to be transferred from the common DC bus to the ESS, which is referred to as virtual loading.

Embodiment 8. The method of embodiment 5, wherein a sliding mode controller is configured to receive a desired DC current set point that is representative of a desired amount of current through the one or more inverters, receive sensor data that is representative of an actual amount of current flowing through the one or more inverters, and iterate values of an intermediate DCSP until the actual amount of current substantially equals the desired amount of current.

Embodiment 9. The method of embodiment 1, further comprising changing, via the ESS controller, the first DCSP in response to the change in the DC voltage when the DC voltage is in an Idle Zone; and urging the voltage of the common DC bus to track the change in the DC voltage when the DC voltage is in the Idle Zone.

Embodiment 10. The method of embodiment 1, wherein the system is Idle when the DC Voltage is within an arbitrary Idle Zone range and a power state of the ESS is supplying or receiving substantially zero average current via the one or more inverters.

Embodiment 11. The method of embodiment 10, wherein the ESS controller detects a system power event by determining a voltage zone of the common DC bus and determining an amount of current between the ESS and the common DC bus.

Embodiment 12. The method of embodiment 11, wherein the amount of current is not substantially zero.

Embodiment 13. The method of embodiment 1, wherein the measuring further comprises determining a nominal DC voltage of the common DC bus by filtering out AC components of the measured DC voltage when the ESS is in a neutral power state.

Embodiment 14. The method of embodiment 13, further comprising allowing the DCSP to substantially equal the nominal DC voltage while the DC voltage of the common DC bus is within an Idle Zone.

Embodiment 15. The method of embodiment 14, further comprising limiting a rate of increase or decrease of the DCSP based on current limits of the system.

Embodiment 16. The method of embodiment 15, further comprising applying a dampening coefficient to the estimated Vnom of the common DC bus, thereby reducing an amount of power transferred between the ESS and the common DC bus from a desired amount of power to manage a power load event on the common DC bus.

Embodiment 17. The method of embodiment 16, wherein the dampening coefficient is at least partially based on a state of charge of the ESS, activity of the system, limits of system equipment, user requirements, operational requirements, or combination thereof.

Embodiment 18. The method of embodiment 17, wherein machine learning is used to determine the dampening coefficient.

Embodiment 19. The method of embodiment 18, wherein the machine learning uses fuzzy logic to determine the dampening coefficient.

Embodiment 20. The method of embodiment 1, further comprising setting the first DCSP, while subject to a power event on the common DC bus, to manage power requirements of the common DC bus, wherein setting the first DCSP comprises setting the first DCSP to the estimated Vnom or substantially to an upper limit of a Dampening Zone of the DC voltage of the common DC bus.

Embodiment 21. The method of embodiment 20, further comprising, while the DC voltage of the common DC bus is raised above the estimated Vnom or a neutral zone of the voltage of the common DC bus, wherein the neutral zone is when the common DC bus is within a neutral power state, and wherein the neutral power state is where current between the ESS and the common DC bus is substantially zero, operating the one or more inverters to transfer power to the ESS from the common DC bus to lower the DC voltage toward the DCSP.

Embodiment 22. The method of embodiment 21, further comprising, while the DC voltage of the common DC bus is above the estimated Vnom, operating the one or more inverters to transfer power from the common DC bus to the ESS to lower the DC voltage toward the DCSP.

Embodiment 23. The method of embodiment 21, further comprising reducing a rate of change of current supplied from the common DC bus to the ESS by a current limiting module of the ESS controller.

Embodiment 24. The method of embodiment 1, further comprising, while subject to a power event on the common DC bus that lowers the DC voltage below the estimated Vnom or a neutral zone of the DC voltage of the common DC bus, wherein the neutral zone is when the common DC bus is within a neutral power state, and wherein the neutral power state is where current between the ESS and the common DC bus is substantially zero, operating the one or more inverters to transfer power from the ESS to the common DC bus to raise the DC voltage toward the DCSP.

Embodiment 25. The method of embodiment 24, further comprising reducing a rate of change of current supplied from the ESS to the common DC bus by a current limiting module of the ESS controller.

Embodiment 26. The method of embodiment 1, further comprising limiting current between the ESS and the common DC bus by a current limiting module of the ESS controller, where a maximum allowed current is determined based on a state of charge of the ESS, cables coupling the ESS to the common DC bus, a number of energy storage devices of the ESS that are online, user configured limits, or a combination thereof.

Embodiment 27. The method of embodiment 1, further comprising decreasing the DCSP by an offset value which causes the one or more inverters to detect a virtual excess of energy on the common DC bus and causes the one or more inverters to transfer power from the common DC bus to the ESS.

Embodiment 28. The method of embodiment 27, wherein the transferred power charges the ESS.

Embodiment 29. The method of embodiment 1, further comprising increasing the DCSP by an offset value which causes the one or more inverters to detect a virtual need for energy to be supplied to the common DC bus and causes the one or more inverters to transfer additional power from the ESS to the common DC bus.

Embodiment 30. The method of embodiment 29, wherein the additional power shares in supplying power to the one or more loads from the common DC bus.

Embodiment 31. The method of embodiment 1, further comprising converting the DCSP to a pulse train of a desired frequency; and delivering the pulse train to the one or more inverters for controlling power transfers of the one or more inverters thereby urging the DC voltage toward the DCSP.

Embodiment 32. A method for managing power of a system with an energy storage system (ESS), the method comprising:

coupling one or more loads of the system to a common direct current (DC) bus;

measuring, via an ESS controller coupled to a sensor, a DC voltage of the common DC bus;

detecting, via the ESS controller, a change in the DC voltage;

managing, via the ESS controller, a DC voltage set point (DCSP) for each of one or more inverters, wherein the one or more inverters are configured to control the DC current flowing through the one or more inverters based on the DCSP; and managing, via a controller, DC current flowing through one or more inverters coupled between the ESS and the common DC bus.

Embodiment 33. A system comprising a processor and a non-transitory memory, wherein the processor executes instructions stored in the non-transitory memory to perform one or more of the methods of the current disclosure.

While the present disclosure may be susceptible to various modifications and alternative forms, specific embodiments have been shown by way of example in the drawings and tables and have been described in detail herein. However, it should be understood that the embodiments are not intended to be limited to the particular forms disclosed. Rather, the disclosure is to cover all modifications, equivalents, and alternatives falling within the spirit and scope of the disclosure as defined by the following appended claims. Further, although individual embodiments are discussed herein, the disclosure is intended to cover all combinations of these embodiments.

What is claimed is:

1. A method for managing power of a system with an energy storage system (ESS), the method comprising:

coupling one or more loads of the system to a common direct current (DC) bus;

measuring, via an ESS controller, a DC voltage of the common DC bus;

estimating, via the ESS controller, an estimated nominal DC voltage (Vnom) for the common DC bus based on a change in the DC voltage over time;

determining, via the ESS controller, a first DC voltage set point (DCSP) for each of one or more inverters on the ESS based on the estimated nominal DC voltage, wherein the one or more inverters are electrically connected to the common DC bus, and wherein the first DCSP is a desired DC voltage on the common DC bus; and controlling current flow through the one or more inverters to maintain the DC voltage of the common DC bus based on the first DCSP wherein controlling current flow through the one or more inverters further comprises:

determining a desired DC current set point representative of a desired current through the one or more inverters;

receiving sensor data representative of an actual current flowing through the one or more inverters; and adjusting an intermediate DCSP for the one or more inverters based on the sensor data and the desired DC current set point.

2. The method of claim 1, further comprising:

measuring, via the ESS controller, a change in a DC current on the common DC bus; and determining, via the ESS controller, that a power event is occurring on the common DC bus.

3. The method of claim 1, wherein estimating the estimated nominal DC voltage further comprises determining, via the ESS controller, that the ESS is in a neutral power state, wherein the neutral power state refers to when an average of a DC current flowing through the one or more inverters is substantially zero.

4. The method of claim 3, wherein estimating the estimated nominal DC voltage further comprises iteratively changing, via the ESS controller, an initial DCSP for each of the one or more inverters until the average of the DC current flowing through the one or more inverters is substantially zero and setting the first DCSP to substantially equal a value of the initial DCSP that causes the average of the DC current flowing through the one or more inverters to be substantially zero.

5. The method of claim 1, determining a second DCSP that forces a predetermined amount of power to be transferred between the ESS and the common DC bus.

6. The method of claim 5, wherein the second DCSP causes the predetermined amount of power to be transferred from the ESS to the common DC bus, which is referred to as load sharing.

7. The method of claim 5, wherein the second DCSP causes the predetermined amount of power to be transferred from the common DC bus to the ESS, which is referred to as virtual loading.

8. The method of claim 1, wherein controlling current flow through the one or more inverters is performed by a sliding mode controller.

9. The method of claim 1, further comprising changing, via the ESS controller, the first DCSP in response to a change in the DC voltage when the DC voltage is in an Idle Zone; and urging the voltage of the common DC bus to track the change in the DC voltage when the DC voltage is in the Idle Zone.

10. The method of claim 1, wherein the system is Idle when the DC Voltage is within an Idle Zone range and a power state of the ESS is supplying or receiving substantially zero average current via the one or more inverters.

11. The method of claim 10, wherein the ESS controller detects a system power event by determining a voltage zone of the common DC bus and determining an amount of current between the ESS and the common DC bus.

12. The method of claim 11, wherein the amount of current is not substantially zero.

13. The method of claim 1, wherein the measuring the DC voltage of the common bus further comprises determining the estimated nominal DC voltage of the common DC bus by filtering out AC components of the measured DC voltage when the ESS is in a neutral power state.

14. The method of claim 13, further comprising setting the first DCSP to substantially equal the estimated nominal DC voltage while the DC voltage of the common DC bus is within an Idle Zone.

15. The method of claim 14, further comprising limiting a rate of increase or decrease of the first DCSP based on current limits of the system.

16. The method of claim 15, further comprising applying a dampening coefficient to the estimated nominal DC voltage of the common DC bus, thereby reducing an amount of power transferred between the ESS and the common DC bus from a desired amount of power for managing a power load event on the common DC bus.

17. The method of claim 16, wherein the dampening coefficient is at least partially based on a state of charge of the ESS, activity of the system, limits of system equipment, user requirements, operational requirements, or combination thereof.

18. The method of claim 17, wherein machine learning is used to determine the dampening coefficient.

19. The method of claim 18, wherein the machine learning uses fuzzy logic to determine the dampening coefficient.

* * * * *